INVENTOR.
JAMES W. CROWE
BY
Ralph L. Thomas
ATTORNEY

July 26, 1966 J. W. CROWE 3,263,220

TRAPPED-FLUX MEMORY

Filed Oct. 15, 1956 9 Sheets-Sheet 9

United States Patent Office 3,263,220
Patented July 26, 1966

3,263,220
TRAPPED-FLUX MEMORY

James W. Crowe, Hyde Park, N.Y., assignor to International Business Machines Corporation, New York, N.Y., a corporation of New York
Filed Oct. 15, 1956, Ser. No. 615,830
24 Claims. (Cl. 340—173.1)

The present invention relates generally to electrical and magnetic circuits and more particularly to such circuits involving superconductive materials.

Before Kamerlingh Onnes liquified helium in 1908 and made possible experiments at temperatures near asbolute zero for the first time, several provisional suppositions were advanced for the purpose of predicting the behavior pattern of resistance versus temperature of materials. One prediction supposed that resistance decreases with descending temperatures until at some given temperature, electrons condense on the atoms and cause increasing resistance for further descending temperatures; while a second prediction assumed a decrease in resistance with lowering of temperature until at a given temperature, resistance levels off and is thereafter constant for further descending temperatures, the constant value of resistance being a function of the ever present impurities, however small the quantity, in the material; and yet a third prediction assumed that resistance decreases continuously with decreasing temperatures until at absolute zero the resistance also is zero. Experimenting with mercury in liquid helium in 1911, Onnes proved each of the foregoing assumptions erroneous, at least as a general hypothesis, because he found that the electrical resistance of mercury decreased as a function of decreasing temperature until at a given temperature (about 4.12° K. for mercury) the resistance disappeared altogether, and very sharply; at least the resistance, if any remained, was so small it could not be measured. Since that time experiments by others involving induced current in supercooled materials serve to justify the assumption of Onnes that the resistance is zero because no loss in current amplitude was observed over a period of years. The temperature at which the transition to zero resistance takes place in a material is referred to as the critical temperature, and because a material undergoes such a transition, it is appropriately referred to as a superconductor. Superconductivity is definitive of this characteristic of a material.

Since the initial experiments by Onnes in 1911, some twenty-one elements, countless alloys and numerous compounds have been found to be superconductors. The critical temperatures for materials thus far found to be superconductive lie in a range between about 17° K. down to within a few thousandths of a degree from absolute zero. Since it is assumed theoretically impossible to reach absolute zero temperature, the behavior pattern of materials at this ultimate limit must remain in the realm of conjecture. A group of many materials do not exhibit the superconductive property at the lowest temperatures thus far reached, and included among this group are silver and gold which have relatively low electrical resistance at room temperature.

In further experiments conducted in 1913, Onnes found that if the amplitude of current in a superconductor is increased as the temperature is held constant at or below the critical temperature, a current value is reached where the superconductive state is lost, i.e., some resistance is restored. It was concluded that upon reaching a certain intensity, the self-magnetic field established by the current flowing in the superconductor destroyed superconductivity. This magnetic field is designated as the critical field, and the intensity thereof varies somewhat as a parabolic function of the temperature for any superconductor. For example, at the critical temperature the intensity of the critical field is relatively small, but as the temperature is lowered toward absolute zero, the intensity of the critical field increases toward a maximum. The slope of the curve of temperature versus critical field intensity varies with the superconductive material. The starting point of this curve is the critical temperature with zero field which temperature, it is recalled, varies also with the various material. Unlike the operation in some magnetically controlled devices, the direction of the field relative to the superconductor is immaterial. Intensity of the field regardless of direction appears to be the controlling influence which destroys superconductivity.

Between the superconductive state on the one hand and the normal or resistive state on the other, there appears to be a third state, sometimes referred to as the intermediate state, which exists during the transition from the normal to the superconductive state or vice versa. In this intermediate state a specimen, according to some theories, is broken into a mixture of normal and superconductive regions. As the percentage of normal regions increases, the specimen approaches the normal state, and as the percentage of superconductive regions increases, the specimen approaches the superconductive state. The resistance of the specimen reaches its maximum value when the specimen is normal throughout its entirety and zero when the specimen is completely superconductive. In some cases the transition through the intermediate state is relatively slow or continuous; while in other cases the transition is extremely sharp and for most practical purposes is discontinuous.

Some unique and interesting phenomena, not otherwise encountered, exist between magnetic fields and materials at low temperatures. Any applied magnetic field less than the critical field cannot pierce or cut through a pure superconductor. Hence, a superconductor is a perfect insulator or barrier to magnetic fields having an intensity less than that of the critical field. An explanation for this effect is that the field actually penetrates small depth on the order of $10^{-5}$ centimeters into the surface of the superconductor and thereby induces a surface current which, because of zero resistance in the superconductor, is sufficient in amplitude to produce a field of equal intensity but in opposition with the applied field. In other words, the applied field is counteracted or neutralized by the field resulting from the induced surface currents, sometimes called screening currents or supercurrents, and cannot pass completely through the superconductor. Hence the superconductor behaves as if it had zero magnetic permeability or a strong diamagnetic susceptibility. Magnetic fields having an intensity in excess of that of the critical field create the intermediate state and the magnetic lines of flux may then exist in or propagate through a normal region of the specimen. Pictorially, consider the intermediate state as island regions of normal material in a sea of superconductive material; lines of flux of an applied field may then penetrate the various islands but not the sea of superconductive material; however, the flux density in a given island may increase to a point where the critical field is exceeded for the surrounding superconductive material; whereupon the islands of normal regions may then expand, as superconductivity of surrounding material is destroyed, and provide a path through which the lines of flux can travel. In the intermediate state the magnetic field pattern and its behavior is somewhat complicated, but it can be seen that specimen shape has an important bearing. Restated briefly, the magnetic field (1) follows the usual behavior in normal material, (2) cannot pierce or cut through a pure superconductor, and (3) distributes itself in a more or less complex pattern in normal regions of a superconductor in the intermediate state.

Various other known factors which change with a superconductive transition include specific heat, volume, thermoelectric property and thermal conductivity. The specific heat undergoes a discontinuous change at the transition temperature. If the superconductive transition is made in the presence of a magnetic field, there is a latent heat of transition and a change in volume, both of which are explicable in terms of thermodynamic principles. In the absence of a field, no such changes occur. Although thermal conductivity is lower for pure metals in the superconductive state, it is higher for particular alloys, and the thermal conductive change is discontinuous whenever the superconductive transition is made in the presence of a magnetic field. It has been determined that current flow in a superconductor is along the surface at a depth of about $10^{-5}$ centimeters and that there is zero resistance at a clean contact between two superconductors. A host of writings with a more thorough and detailed presentation of the phenomenon as well as various theories relating to superconductivity are available, one of which is "Cambridge Monographs on Physics" (Superconductivity), second edition, by D. Shoenberg.

Operating temperatures near absolute zero are readily obtained with liquified helium or hydrogen, the former being preferred over the latter because of its non-explosive characteristic. It is well known that some control can be exercised over the temperature of a refrigerant by controlling its pressure. The boiling point of liquid helium, for example, is 4.2° K. at a pressure of 1 atmosphere. With increasing pressure the boiling point can be raised, and with decreasing pressure it can be lowered. The behavior of liquid helium below 2.19° K., referred to as helium II, is such that it conducts heat very rapidly and appears to have zero viscosity. The speed at which heat is conducted is about the same as the speed of sound which gives rise to the descriptive term "thermal superconductivity," and the relative ease with which the fluid can pass through minute cracks and capillaries gives rise to the appropriate term "superfluidity." Further information concerning helium and other low temperature fluids which may be suitably employed for securing low temperatures can be found in various writings, one of which is "Superfluids," volumes I and II by Fritz London. For a discussion of a practical arrangement for securing low temperatures as well as a discussion of one type of superconductive element which may be employed for various functions, reference is made to an article entitled "The Cryotron—A Superconductive Computer Component" by D. A. Buck in the Proceedings of the I.R.E. for April 1956.

According to the principles of the present invention a unique and novel arrangement of circuits including superconductive materials is provided which may perform logical as well as memory functions. In one of its novel forms the invention includes a basic cell which comprises a superconductive material in which currents may be induced. Because the resistance of the material is zero when the material is superconductive, induced currents may persist indefinitely and be interrogated when desired. Employed for storage purposes, persistent currents may be established in the clockwise or counterclockwise direction and designated arbitrarily as binary one and zero respectively, or vice versa. Alternatively, persistent currents in the same direction may have different amplitudes which may be designated as binary one and zero. In a cell where persistent current direction represents binary information, the current in a cell may be established in the direction representing binary zero upon readout; if the current direction is reversed in the reading process, this may be detected by a sensing means and designated as a binary one; if on the other hand there is no reversal in current direction upon readout, this may be detected by a sensing means and designated as a binary zero. In a cell where persistent current amplitude represents binary information, the current in a cell may be established at the amplitude representative of binary zero upon readout; if there is a change in current amplitude upon readout, this may be detected by a sensing means and designated as a binary one; if on the other hand there is no change in current amplitude upon readout, this may be detected by the sensing means and designated as a binary zero. Under certain conditions the reading of a binary zero in either of the above methods may result in no signal at all being induced in the sensing means. Under these circumstances the ratio of induced signal when reading a binary one to the induced signal when reading a binary zero is infinite.

Besides the memory function, a cell of the present invention can be employed as a logical device such as, for example, an AND circuit, an OR circuit and a gate circuit of the coincident or anti-coincident type. The coincident gate yields an output signal in response to two simultaneous input signals, and the anti-coincident gate provides an output signal in response to two input signals displaced in time or non-coincident in occurrence. In another arrangement the cell of the present invention may be employed as a switch device where the switch is in effect opened by an applied signal of one polarity and in effect closed by an applied signal of oppoiste polarity. In yet another arrangement the cell of this invention may be employed as a frequency divider where, for example, two input signals of a given polarity may provide an output pulse, effecting a division by two. Division by a greater factor such as 4, 8, 16 etc. can be secured with additional cells of this type serially related. The frequency division factor of a single cell, on the other hand, can be changed with an alternative scheme by varying the amplitude and width of the input signal, thereby providing division of a given input wave by a factor of 2, 3, 4 etc. Various other functions in addition to the foregoing will become apparent to one skilled in the art in view of the present invention.

Bearing in mind that the geometry of a cell is important, consideration should be given to the form or structure thereof with the understanding that numerous configurations may be suitably employed, some being more desirable for various purposes than others. Basically, the cell of the present invention includes a body of superconductive material, some means to apply a magnetic field thereto which induces a current that persists therein, and a sense means to detect the persistent current. Inasmuch as numerous materials may be chosen for the super-conductive medium, the highest operating temperature is determined once the material is selected, and the critical field is in turn determined by both the selected material and a given operating temperature. If the operating temperature is at or slightly below the critical temperature in zero magnetic field, the control technique or the manner of controlling the cell is then such that small magnetic fields can be utilized to induce persistent currents. In order to simplify the control technique further, the cell may incorporate several types of material in various parts of its construction so that one of the materials can be made normal with a relatively smaller magnetic field than remaining materials. In this manner currents induced by a small field in the one material, constituting one portion of the cell, may persist in the various materials forming the cell after the field is removed.

In a more elaborate arrangement of the above described cells in a memory system, an addressing scheme for read and write operations may utilize several drive lines for selection purposes. In a two-dimensional array, for example, X and Y drive lines may be arranged with a cell at each coordinate intersection. Selected X and Y drive lines may be energized with currents which individually create fields less than the critical field, but the combination at a selected coordinate intersection may be such as to exceed the critical field, provided the fields are in an aiding relationship. Moreover, the critical field may be secured by coincident energization of three or more lines instead of two lines if desired. A plurality of two dimensional arrays can be incorporated into a three dimensional memory arrangement.

A high degree of flexibility is afforded by the manner in which the external field may be used to control a cell in various novel arrangements for memory as well as logical functions, and such will become more apparent as the description further unfolds the novel aspects of the present invention.

Accordingly, it is an object of the present invention to provide a novel cell.

Another object of the present invention is to provide a unique element or cell employing superconductive materials.

A further object of the present invention is to provide a cell using the principles of superconductivity in a novel memory arrangement.

A still further object of the present invention is to provide a cell using superconductive materials in a novel arrangement for logical purposes.

Yet another object of the present invention is to provide a novel cell composed of superconductive materials wherein persistent current may be utilized for storage purposes.

Still another object of the present invention is to provide a novel cell of superconductive materials wherein persistent currents may be established in either of two directions by a magnetic field for the purpose of representing binary information.

A further object of the present invention is to provide a unique arrangement of superconductive materials whereby a magnetic field may be used to control the cell to induce persistent current capable of being employed for logical purposes.

Yet another object of the present invention is to provide a novel arrangement of several superconductive materials in a unit or cell whereby a relatively small magnetic field can be used to control the cell by operating on one of the materials of the cell.

A further object of the present invention is to provide a device having a speed of operation limited primarily by the time that it takes a magnetic field to pierce a thin superconductor, being on the order of $10^{-9}$ seconds.

A further object of the present invention is to provide a cell composed of superconductive materials in a novel arrangement of a very high speed memory system.

A still further object of the present invention is to provide a novel superconductive device as a high speed logical element.

Another object of the present invention is to provide a superconductive device which may serve as a logical AND circuit.

Still another object of the present invention is to provide a superconductive device which may serve as a logical OR circuit.

Yet another object of the present invention is to provide a superconductive device capable of being operated as a switch which permits or prevents the passage of signals.

A further object of the present invention is to provide a superconductive device that can perform as a frequency divider which provides an output signal in response to a given number of input signals.

Another object of the present invention is to provide a gate circuit utilizing the principles of superconductivity.

A further object of the present invention is to provide a novel system of superconductive devices which is relatively simple in construction and efficient in operation.

A still further object of the present invention is to provide a novel arrangement of superconductive devices which is relatively inexpensive to manufacture and use.

Other objects of the invention will be pointed out in the following description and claims and illustrated in the accompanying drawings which disclose, by way of example, the principles of the invention and the best modes, which have been contemplated, of applying those principles.

Figure 1:
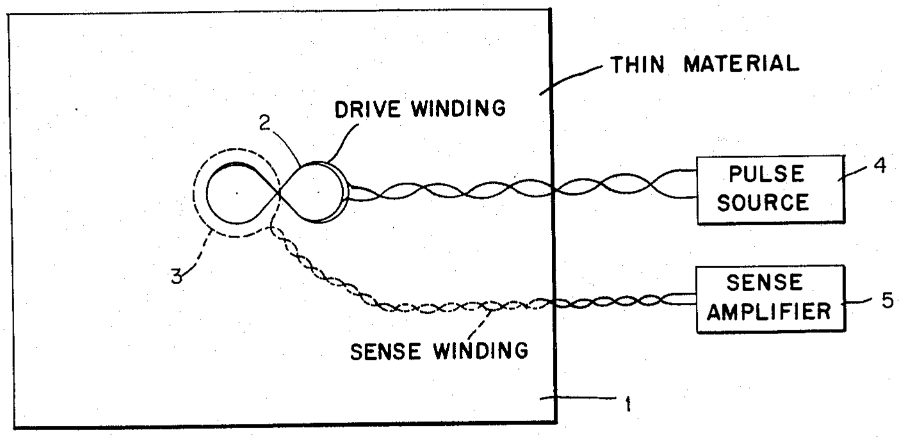
FIG. 1 illustrates one arrangement of a cell constructed according to the principles of the present invention.

With reference to the drawings, the invention is illustrated in some of its various aspects. In one form, for example, the cell may include the construction of FIG. 1 having a thin film of material 1 in the superconductive state with a figure eight winding 2 disposed on one side and a circular sense winding 3 disposed on the opposite side. By applying to the winding 2 a current pulse, having an amplitude sufficient to create a magnetic field equal to or greater than the critical field, from a pulse source 4, the superconductive material 1 is presumably made normal in areas adjacent to the figure eight winding, and a magnetic field is created, linking the two enclosed areas or holes of the figure eight and forming a closed loop of magnetic lines of flux which penetrate the thin film. The magnetic field may pass in one direction through the areas of thin film adjacent to one of the holes of the figure eight winding and return in the opposite direction through the film in areas adjacent to the other hole of the figure eight winding. A signal induced in the circular sense winding 3 disposed on the side of the film opposite to the figure eight winding is made possible because the magnetic lines of flux penetrate the film. The diameter of the circular sense winding may be greater, equal to or less than the diameter of one of the holes of the figure eight winding 2. The external field is no longer maintained by the figure eight winding 2 when the current pulse thereto is terminated. As this field decays to some value less than the critical field, magnetic lines of flux are trapped in the thin film so to speak because superconductivity is restored, and the field is unable to collapse through the superconductor. Explained alternatively, it might be said that currents are induced in the film 1 by the decaying magnetic field, and as superconductivity is restored, they persist and maintain a self field. The phenomenon of trapped flux has been under study by many workers in the superconductor art and a treatment of the phenomenon of trapped flux appears on pages 14–16 of the London text referred to above as well as on pages 6, 37, 44 and 151 of the Shoenberg text alluded to in this specification. If a current pulse of similar amplitude but of opposite polarity to that mentioned above is next applied to the figure eight winding 2, the events which take place are the same except the direction of the magnetic field is reversed and the direction of the signal induced in the winding 3 is reversed. Employed as a memory device or as an anti-coincident gate circuit, a cell of this type may employ a sense circuit 5 to eliminate one of the bidirectional signals induced in the output or sense winding 3. For memory purposes groups of cells may be employed in a two dimensional array, and the number of arrays can be varied as needed.

Figures 2, 13:
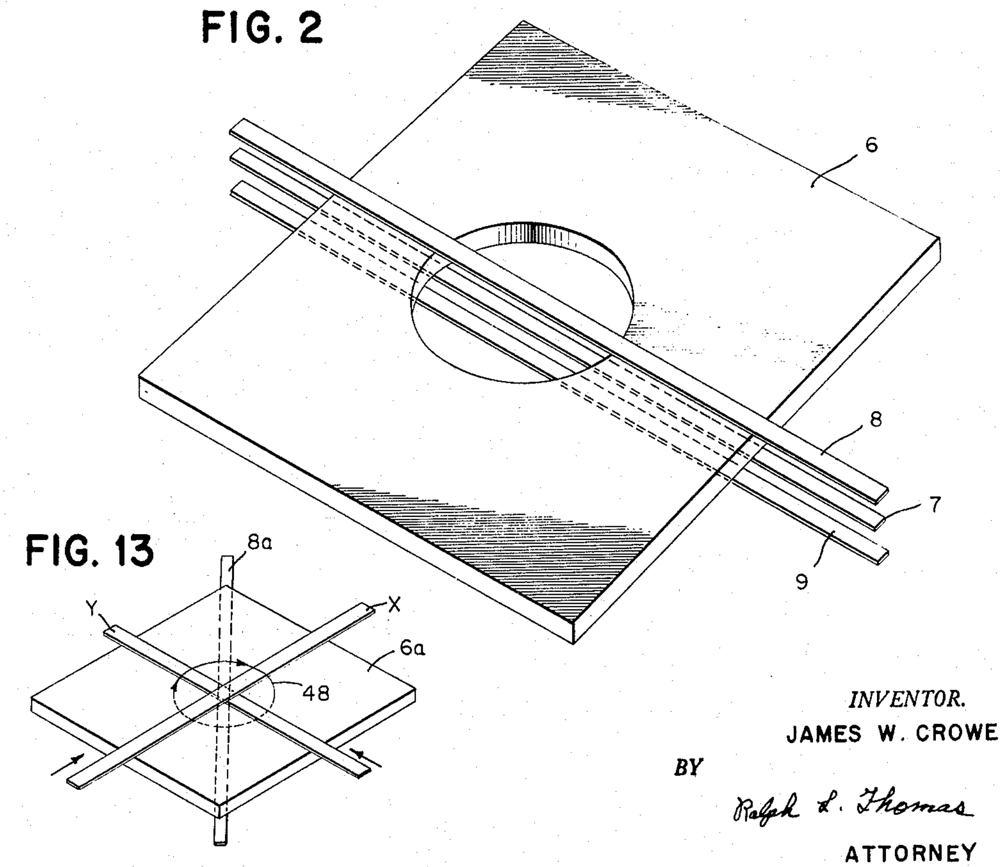
FIG. 2 illustrates another arrangement of a cell constructed according to the principles of the present invention.
FIG. 13 illustrates another arrangement of a cell constructed according to the principles of the present invention.

In yet another form which the cell may take, for example, consider the construction of FIG. 2 where a superconductive plate or film 6 has an aperture therein and a relatively narrow strip of thin superconductive material 7 bridging the aperture and making electrical contact with the film. With a thin sense winding 8 insulated from but located close to one side of the narrow strip and a drive winding 9 insulated from but located close to the other side of the narrow strip, a relatively small field around the drive winding 9 can be effective to operate the cell. It is felt that, even if the critical field were the same in amplitude as in the previously discussed cell, the total lines of flux required to restore normality in the narrow strip of this cell are decreased over that of the former cell because the controlled area of the superconductor involved is less. Once the narrow strip 7 is made normal by a field established around the drive winding 9 as the result of current flowing therethrough, lines of flux cut through and induce a voltage in the narrow strip 7 which causes current to flow along the narrow strip out one end, around on the opposite surfaces of the divided aperture and back into the strip at its other end. The narrow strip 7 in effect constitutes a common portion of two parallel circuits. Some of the lines of flux established around the narrow strip 7 as a result of current flow therein cut the sense winding 8 and induce a voltage therein. As the applied magnetic field established around the drive winding 9 is terminated, currents persisting in the narrow strip 7 as it goes superconductive maintain a field in one direction around the strip 7. By applying to the strip 7 a field of similar amplitude but of opposite direction to that described above, the direction of the persistent currents is reversed in the strip 7, and in the process a voltage of opposite polarity is induced in the sense winding 8. As mentioned with respect to the cell of FIG. 1, a sense circuit may be employed to eliminate one of the bipolar signals induced in the sense winding 8. By using a different material which has a still lower critical field for the narrow strip 7, smaller magnetic fields can be employed for control purposes. In such case it may be preferable to use a first type of material for the thin film 6 which has a relatively high critical field and a second type of material for the narrow strip 7, which has a relatively low critical field. Hence the cell can be operated with a field which is less than the critical field of the first material, but greater than the critical field of the second. A further important advantage secured in such case is that the first material may remain superconductive at all times, thereby reducing electrical losses therein and concomitant heat losses in the cell.

Figure 3:
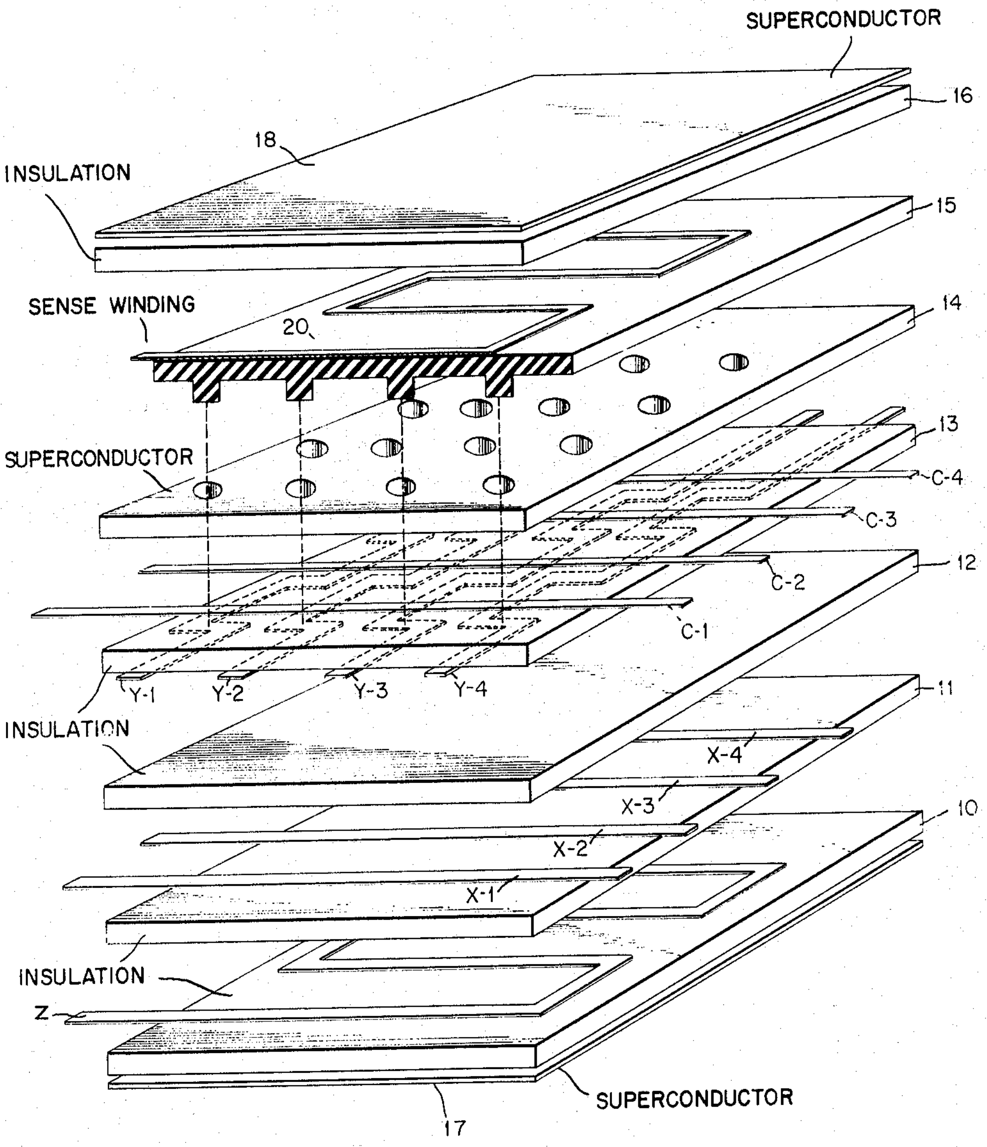
FIG. 3 illustrates a memory system incorporating the cellular construction of FIG. 2.

Referring next to FIG. 3, the superconductive device therein illustrated incorporates a plurality of cells of the type shown in FIG. 2 in a memory arrangement in which reading and writing operations may take place. A series of thin films or plates 10 through 16, normally in close proximity with each other and forming a compact arrangement, are displaced as shown for ease of illustration. The plates or films 10 through 13, 15 and 16 are composed of suitable insulation material, but the plate 14 is composed of a suitable superconductive material. For example, silicon monoxide, magnesium fluoride, as well as other insulation materials may be employed for the films 10 through 13, 15 and 16; whereas lead, tantalum, as well as other superconductive materials may be employed for the film 14. On top of the insulation film 10 is mounted a conductor Z employed, as more fully explained hereafter, as a drive line. A group of conductors labeled X–1 through X–4 are positioned above and parallel to the various portions of the Z winding and insulated therefrom by the thin film 11; while a group of conductors labeled Y–1 through Y–4, positioned between the insulation material 12 and 13, have portions disposed at a 90° relationship with respect to the X lines and other offset portions disposed parallel to the X lines similar in function to cross-bar 7. A group of lines labeled C–1 through C–4 on top of film 13 are disposed in parallel relationship with the X lines, and each is in parallel relationship with the off-set portions of each of the Y lines. In practice the superconductive material 14 is placed on top of the C lines in abutting relationship therewith with the center of the various rows of holes in the plate 13 being positioned preferably in a straight line immediately over the center of the corresponding C lines. A sense winding 20 has portions which run in a parallel relationship with the various C lines and is insulated from the superconductive material 14 by the insulation material 15. The sense winding 20 is made of non-superconductive material because it must serve to detect small changes in magnetic field by means of an induced signal. Thin plates or films 17 and 18 disposed below and above respective insulation plates or films 10 and 16 are composed of a superconductive material. The critical magnetic field of the superconductive films 17 and 18 is preferably much higher than the magnetic fields created therebetween so that these films serve as a shield which prevents magnetic fields from passing therethrough. If several arrays of the type shown in FIG. 3 are arranged adjacent to each other, plates 17 and 18 serve to prevent magnetic fields of each array from interfering with those of another. In addition the films or plates 17 and 18 serve to reduce the magnetic energy stored in a given cell of the array. That is, these plates tend to minimize the heat generated by reading and writing operations since these plates limit the mean magnetic path of magnetic lines of flux created in and around the cells.

Several methods may be employed in order to perform writing operations in the embodiment of FIG. 3. First, a 2:1 selection system can be used where a unit current flowing in each of two drive lines coincidently is sufficient to exceed a threshold value and perform a writing operation. For example, a unit current in a selected Y line, a unit current in a selected X line can be made sufficient to cause a writing operation, the Z winding remaining de-energized. If the Z winding is energized with a unit current in a direction to oppose the effect of a unit current in the X line or a unit current in the offset portion of the Y line, the writing operation may be inhibited. Thus the term "2:1 selection system" indicates that two unit amplitude pulses are needed to change the binary state of the present superconductive memory cell but a single unit amplitude pulse will not. Second, a 3:2 selection system can be used where a unit current in three lines is necessary to perform a writing operation, but two unit amplitudes of current or less will not affect a change of state in the memory cell. In this system, a unit current in the selected X line, a unit current in the selected Y line and a unit current in the Z line are essential to cause writing. Stated in the alternative, a unit current in the first method or two unit currents in the second method cannot effect a writing operation. The term unit current is a relative quantity, the magnitude of which is not ordinarily the same for the two methods enumerated above, and as illustrated more fully hereinafter, the value for a given superconductive device is a function of various factors among which are included operating temperature, material employed and efficiency of the drive windings.

In order to illustrate the first method above, writing is performed in the embodiment of FIG. 3 by simultaneously applying current pulses to a selected X and a selected Y line when it is desired to write an arbitrary binary bit, binary one for example. A selected X line, a selected Y line and the Z line are supplied with current pulses whenever it is desired to write the opposite binary bit, i.e., binary zero with the previous assumption. For purposes of illustration, it is assumed at this point that the selected bit is in the zero condition prior to writing. Current in the Z line is in a direction, when energized, to oppose the current of either the X or the Y drive line. Consequently, the magnetic field produced on a hole at the crossover of a selected X line and the offset portion of a selected Y line when the Z winding is not energized is greater than the total magnetic field produced there when the X, Y and Z lines are energized. The weaker field is ineffective to change the binary information of the selected bit, but the stronger magnetic field at the crossover of the selected X and Y drive lines is sufficient to render normal that portion of the C line passing under the hole. Consequently, magnetic lines of flux penetrate this portion of the C line and establish induced currents therein in a given direction representative of binary information such as binary one. If the current pulses to the X and Y drive lines are then terminated, the portion of the C line at the selected hole, previously normal, returns to its superconductive state since the critical field is removed, and the currents previously induced in the C line persist because there is zero resistance in the superconductive C line and in the superconductive film 14. The persistent current flows through or along the portion of the C line at selected intersection to one of its junctions with the film 14 around the opposite portions along or near the surface of the hole in the film to the other junction of the C line with the film 14 forming a current flow path in the form of a figure eight pattern. The current flow in the C line and the film 14 is assumed along or near the surface to a depth of $10^{-5}$ centimeters. The magnetic field maintained around the C line at the selected intersection prevents the persistent current from wandering away from the selected intersection because this magnetic field is confined laterally within the hole of the super conductive material 14 at the selected intersection. In other words the lines of flux enveloping the C conductor and confined within the hole of the superconductive plate 14 at the selected intersection are unable to penetrate the superconductive material 14, the strength of the magnetic field of the persistent currents being less than the critical magnetic field strength of the superconductive material 14. Thus the persistent current can be maintained indefinitely provided the temperature is maintained sufficiently low to continue the superconductive state of the C line and the superconductive material 14.

If it is desired to read the information from the selected intersection using the 2:1 selection system, the proper X and Y coordinate lines are supplied with current pulses of unit amplitude in a direction opposite to that applied for writing, the Z line remaining de-energized. The intensity of the magnetic field applied to the C line at the selected intersection is sufficiently great to exceed the intensity of the critical field. Thus that portion of the C line bridging the hole in the film 14 at the selected intersection is made normal and the field of the X and Y lines penetrates this portion of the C line, inducing a current in a direction opposite to the previously stored persistent current and reversing the magnetic field which envelops the C line at the selected intersection. This field, having an intensity less than that of the critical field of the superconductive material 14, is confined laterally within the hole of the superconductive material 14 over the selected intersection, but it extends vertically through the hole and up to the sense winding 20, cutting the sense winding 20 and inducing a voltage therein as the field reverses. Thus it is seen that information may be written in a selected location or cell in the superconductive device of FIG. 3, stored indefinitely and selectively read therefrom when desired by using a 2:1 selection system.

In order to write information in the embodiment of FIGURE 3 using a 3:2 selection system, a selected X line, a selected Y line and the Z line are supplied with current pulses of unit amplitude, which in this case are of smaller amplitude than a unit current in the 2:1 selection system, when it is desired to write an arbitrary binary bit, binary one for example. The combined effect of the three unit currents, being in an aiding relationship, is sufficiently great to create a magnetic field in excess of the threshold value or critical field of that portion of the C line bridging the hole of the superconductive material 14 at the selected intersection. Accordingly, this portion of the C line is made normal, the lines of flux penetrate and establish induced currents in a given direction representative of an arbitrary binary bit, binary one for instance. Upon termination of the unit currents in the X, Y and Z lines, the portion of the C line at the selected intersection returns to the superconductive state since the critical magnetic field is removed, and the current induced in the C line persists as there is zero resistance in the superconductive C line and the superconductive film 14. The persistent current continues to circulate in the given direction without loss of amplitude as explained above, provided the temperature is sufficiently low to continue the superconductive state of the C line and the material 14.

If it is desired to read the information from a desired intersection using the 3:2 selection system, the proper X line, Y line, as well as the Z line are supplied with a unit current pulse in a direction opposite to that applied for writing. The intensity of the resultant magnetic field produced by the unit currents in the three drive lines exceeds the critical field of that portion of the C line across the hole in the film 14 at the selected intersection, thereby restoring this portion of the C line to its normal or intermediate state; the resultant field penetrates and induces a current in the normal portion of the C line in a direction opposite to the previously stored persistent current and causes a reversal of the magnetic field which envelops the portion of the C line at the selected intersection. As the field enveloping the C line undergoes a change in direction, a voltage is induced in the sense winding 20 which indicates the binary information read, i.e., binary one in view of the initial assumption arbitrarily made above. Hence, it is shown that information may be written, stored indefinitely and then read using a 3:2 selection system in the superconductive device of FIG. 3.

While the foregoing schemes using the 2:1 or 3:2 selection techniques may be suitably employed for reading and writing operations in the superconductive device of FIG. 3, it is to be understood that this is by way of illustration and is not to be construed as a limitation on the operation of the superconductive device, for other schemes which provide critical fields in an appropriate direction at a proper time on a super-conductive material are adaptable for the purposes of the present invention.

Although the device illustrated in FIG. 3 may be fabricated by several methods, it is especially adaptable to processes employing vacuum metalizing techniques since the metallic and insulation materials are preferably very thin films. According to one suitable arrangement, the insulation material 10 is a substrate having sufficient strength to provide adequate structural support for the thin films 11–16, the X lines, the Y lines and the C lines when formed into a compact unit. As previously mentioned, the embodiment of FIG. 3 is an exploded view of the various parts which in practice are thin films arranged in abutting relationship forming a very compact and thin unit. Because of its required strength, the substrate 10 is perhaps the thickest element in the compact unit, and its thickness varies in practice depending upon the strength of the substrate used and the combined weight of the materials mounted thereon. In order to indicate the order of magnitude of the thickness of the materials involved with the fabrication of the device of FIG. 3, the following tabulation is given by way of illustration.

| Part: | Thickness |
|---|---|
| Substrate **10**, milli-inches | 10 |
| Z winding, Angstroms | 10,000 |
| Film **11**, Angstroms | 10,000 |
| X lines, Angstroms | 10,000 |
| Film **12**, Angstroms | 10,000 |
| Y lines, Angstroms | 10,000 |
| Film **13**, Angstroms | 10,000 |
| C lines, Angstroms | 2,000–5,000 |
| Metallic film **14**, Angstroms | 10,000 |
| Film **15**, Angstroms | 10,000 |
| Sense Winding **20**, Angstroms | 10,000 |
| Film **16**, Angstroms | 10,000 |
| Metallic film, Angstroms | 10,000 |
| Metallic film, Angstroms | 10,000 |

It is noteworthy to mention here however, that the above given dimensions of thicknesses while extremely thin are to be taken as indicative of the order of magnitude involved and are subject to being increased or diminished according to the requirements of materials employed and the temperature at which they are operated. Many interrelated factors have a bearing on the thickness of each material employed in the device of FIG. 3. For instance, the insulation material must be sufficiently thick to serve as a good insulator to minimize electrical losses between the various current-carrying conductors, i.e., sense winding, X, Y, Z and C lines; the drive lines X, Y and Z must be wide and thick enough to carry the proper magnitude of drive current or unit current to provide the necessary critical field to the C line material; and the material 14 must be thick enough to remain superconductive at all times at the operating temperature if bit density is to be high.

Figure 4:
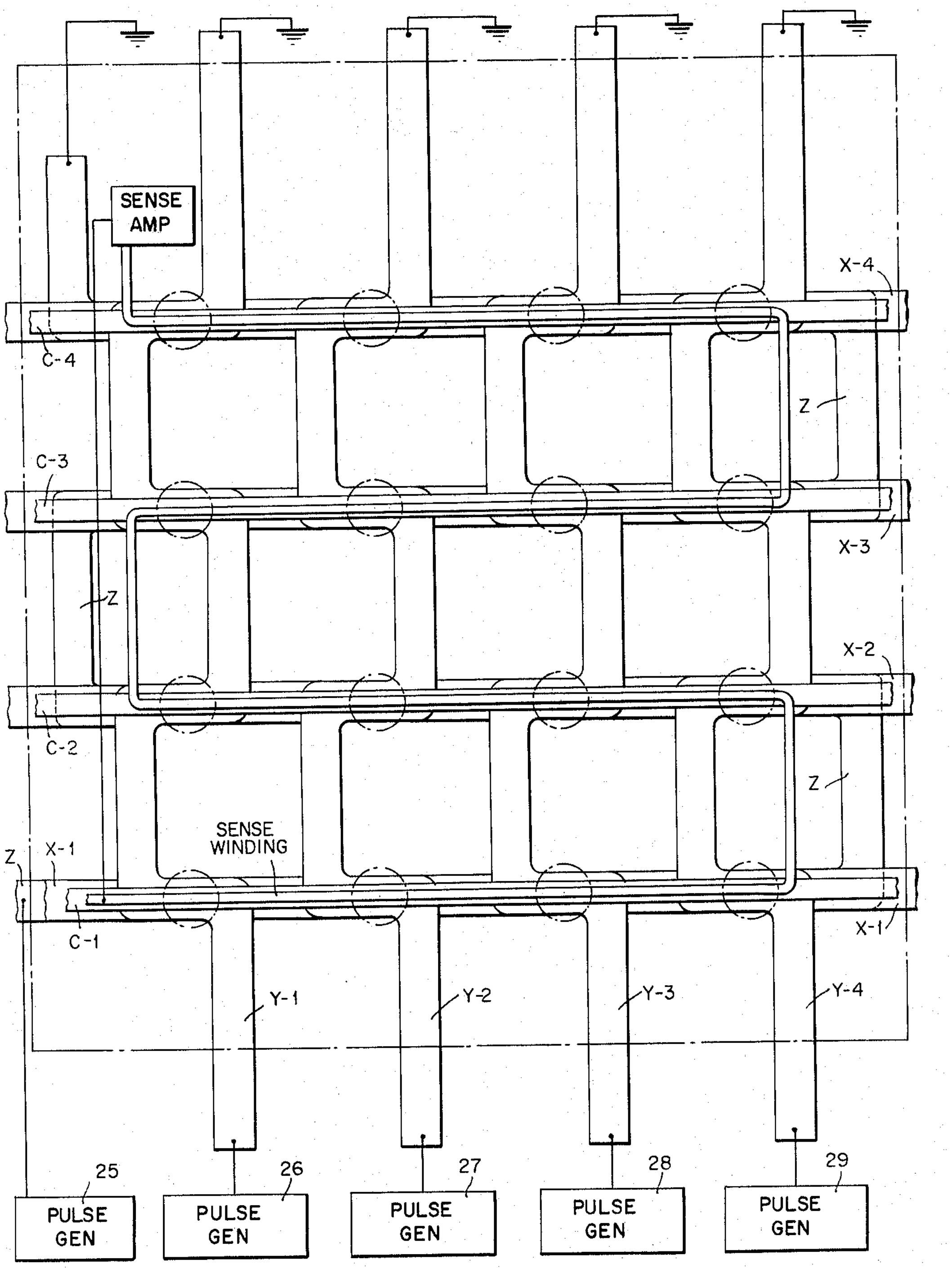
FIG. 4 is a plan view of that part of the structure of FIG. 3 with the various films or plates omitted and shows in greater detail some of the structural arrangement and its association with electrical circuits.

In order to explain in further detail the arrangement of FIG. 3, reference is made to FIG. 4 which is a plan view of FIG. 3 showing the width and the position relative to each other of the sense winding, X, Y, Z and C lines, the films or plates 10 through 15 in FIG. 3 being omitted. The Z winding, lowermost in position in FIG. 3, runs beneath and parallel to the X–1 line in the lower portion of FIG. 4, then crosses over and returns beneath and parallel to the X–2 line, and continues in like fashion beneath the X–3 and X–4 lines. Current flow is established in the Z line by means of a pulse generator 25 which is shown in block form and may be of any one of several types well known in the art. The X lines, Y lines, and Z line are positioned vertically as shown in FIG. 3 and are preferably of the same width as shown in FIG. 4. Pulse generator means 26 through 29 shown in block form in FIG. 4 are connected to the respective lines Y–1 through Y–4, and similar pulse generators, not shown, are connected to the respective lines X–1 through X–4. Since the current in the X lines and the current in the offset portion of the Y lines must be in a direction to produce magnetic fields in an aiding relationship when pulsed, it is desirable to connect the X lines to respective pulse generators in such a manner that current flow in alternate X lines is opposite to current flow in the remaining X lines, all Y lines being energized with current flow in the same direction. When energized using the 2:1 selection scheme mentioned previously, the Z line conducts currents in a direction to produce a magnetic field in opposition with that produced by current flow in both the X and Y lines; whereas in the 3:2 selection system the Z line current produces a field which aids that of the X and Y line currents. The circles shown in dotted line form in FIG. 4 represent the relative positions of the holes in the material 14 shown in FIG. 3. The lines C–1 through C–4 are preferably much narrower than the X lines, the Y lines or the Z line.

Figure 5:
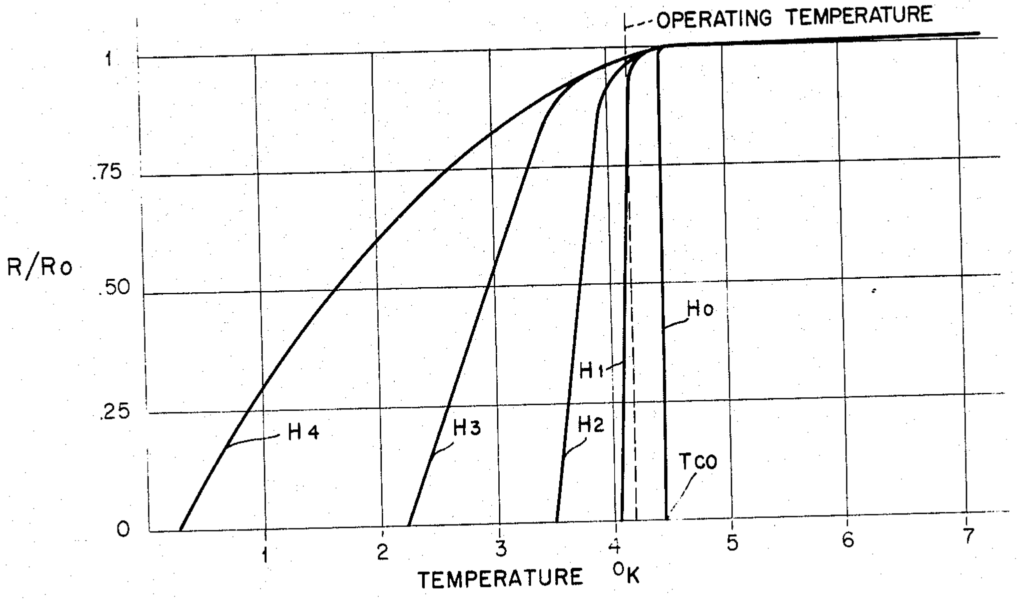
FIG. 5 illustrates the resistance characteristic of a superconductor with and without a magnetic field at low temperatures.

Before proceeding further with an explanation of the operation of the device in FIG. 3, it is appropriate first to consider in greater detail some known behavior patterns and characteristics of superconductive materials. Referring now to FIG. 5, a plot is shown of resistance versus temperature for a superconductor under various magnetic field strengths. Resistance is indicated for convenience as the ratio of resistance (R) at a given temperature over resistance ($R_0$) in the normal state. With a magnetic field of zero ($H_0$) the superconductor undergoes a discontinuous change in resistance from normal resistance to zero resistance at the critical temperature of about 4.4° K. If the temperature of a specimen is lowered while a small magnetic field H1 is applied thereto, the critical temperature is lowered to about 4.05° K., and the transition from the normal to the superconductive state is less sharp. As the field strength is increased, the critical temperature is further lowered in each instance as illustrated by the transition lines labeled H1 through H4 where greater field strengths are represented by the ascending numbers. In a relatively strong field such as H4, the critical temperature is reached at about 0.25° K., and it is interesting to note that the transition from the normal to the superconductive state is relatively more gradual. This characteristic is sometimes referred to as the intermediate state and is accounted for by some theorists as a transition in which some relatively small number of the total number of particles or areas of the specimen are superconductive at the beginning of the transition (about 4.4° K.); the number of superconductive particles increases with decreasing temperature until at the end of the transition (about 0.25° K.) all particles are superconductive. Hence, resistance of the specimen to current flow is decreased as the transition progresses from the normal to the superconductive state because the number of particles which resist current flow are diminishing. Restated in the alternative, the number of particles which provide loss-free paths for current flow are increased as the transition from the normal to the superconductive state progresses, thereby providing a wholly loss-free path to current flow at the completion of the transition.

Figure 6:
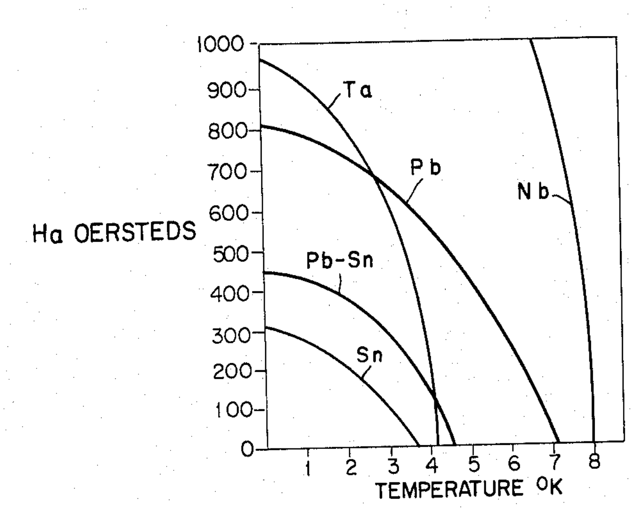
FIG. 6 shows the characteristic curve of temperature versus critical field for various materials.

The critical temperature varies with the material employed, and in the absence of a magnetic field it is about 8° K. for niobium, about 7.2° K. for lead and about 3.75° K. for tin. These temperatures are indicated in FIG. 6 along the line of zero magnetic field. The area to the left and below the curves in this plot represents the superconductive state for the elements indicated, and the area above or to the right indicates the normal state for the respective elements. As pointed out in Schoenberg, cited supra, these curves are somewhat parabolic in shape. The plot in FIG. 6 of field strength in oersted versus temperature in degrees Kelvin provides a complete picture of the behavior or superconductive characteristic of the materials indicated. Materials other than those shown also have a charatceristic curve which is parabolic in shape, but their characteristic curves may be and usually are displaced in position i.e., have a different focus but a common directrix which is along the zero ordinate of FIG. 6. Actually the field strength necessary to restore normality in a given specimen at zero temperature Kelvin is hypothetical since this temperature is impossible to attain, but the rest of each curve is estabilshed by experiments conducted from the highest temperature indicated down to within a few thousandths of a degree from zero Kelvin.

If the temperature is lowered below the critical temperature for any one of the materials in FIG. 6, the resistance of the material becomes zero and remains such unless a magnetic field is applied which is equal to or greater than the critical field for that temperature or the temperature is raised. Controlling the resistive condition of these materials by varying the temperature is a rather slow process, but controlling the resistive condition with a magnetic field can be very rapid. Theoretically, the speed with which a critical magnetic field can control the resistive state of any superconductor is limited only by the time it takes the field to penetrate the material, and with a very thin film of superconductive materials somewhere on the order of $10^{-5}$ cm. thick, the speed of field penetration is in the neighborhood of $10^{-9}$ sec. In some experiments with thin films, it was found that information signals were detectable about $3\times10^{-9}$ sec. after the application of a read pulse. The ultimate limit of $3\times10^{-10}$ sec. can be approached more closely with pulses having a more vertical leading edge i.e. a faster rise time.

If the temperature of a superconductive material is maintained below the critical temperature and a magnetic field equal to or greater than the critical field for that temperature is applied and removed, the superconductive material is rendered resistive in the presence of the field and non-resistive in its absence. Such performance can be secured in practice with relatively small field intensities if the operating temperature of the superconductive material is slightly below the critical temperature in zero magnetic field. With tantalum, for example, which becomes superconductive at 4.4° K. in the absence of a magnetic field, immersed in liquid helium which at a pressure of one atmosphere is at 4.2° K., fields on the order of 50 to 100 oersteds may be employed to restore the normal resistance of the tantalum. It can be seen from FIG. 6 that the minimum field required to establish normality in a specimen at a given temperature is a function of the characteristic curve of the specimen, requiring slight field strength for temperatures slightly below the critical temperature at zero field and relatively large field strengths for temperatures near 0° K. It can be seen further in FIG. 6 that with a field strength of some 50 to 100 oersteds, tantalum at 4.2° K. is rendered normal. That is, the coordinate intersections of the temperature line for 4.2° K. and the field intensity lines for values ranging between 50 and 100 oersteds, will produce a range of intersections some of which are to the right of the characteristc curve for tantalum. Such intersections to the right, it is recalled, indicate the normal or resistive state of the material. A range of values is indicated since in practice measurement of magnetic quantities does not lend itself to the accuracy obtainable in measuring electrical quantities, but with experience it is possible to develop magnetic circuits with a fair degree of accuracy within a given range of values.

Referring again to FIG. 1, the principles of the present invention are further exemplified in this unique and novel arrangement of the thin film 1 having the drive winding 2 disposed on one side and the sense winding 3 on the opposite side. As a memory device the pulse source 4 may supply a current to the drive winding 2 in one direction to establish a condition representative of binary one and in the opposite direction to establish a condition representative of binary zero. As explained previously, the conditions are persistent currents which create a net magnetic field either in the clockwise or counterclockwise direction that may be arbitrarily designated as representing binary one in one direction and binary zero in the opposite direction.

The wires connecting the figure eight winding to the pulse source 4 are twisted as shown in order to minimize the effects of mutual coupling between the wires. For the same reason the wires connecting the sense winding to the sense amplifier 5 are twisted as shown. If a pulse of about 600 milliamperes is supplied in one direction to the winding 2, a magnetic field is established which is strong enough to penetrate the film 1 when composed of lead-tin alloy, of about 60% tin and 40% lead, the thickness of which is approximately 10,000 Angstroms, at an operating temperature of 4.2 k. The field applied to the thin film 1 is strong enough to render the film normal in some areas adjacent to the pattern of the figure eight winding, but the precise pattern of normal areas is not definitely known. In practice the figure eight winding may be composed of 30 turns of 0.003 inch in diameter of niobium wire, the length of which is approximately ¼ inch and the width of which is approximately ⅛ inch. The figure eight winding is separated from the film by a very small amount on the order of .01 inch or less in order to prevent damaging the film. The field caused by pulsing the figure eight winding 2 extends down through one loop thereof through normal areas of the thin film 1, threads through the area of the sense winding, then returns back up through the other normal areas of the film 1 to the opposite loop of the figure eight winding and continues over to the one loop of the figure eight winding, forming a closed magnetic path. If the pulse source 4 supplies a 600 milliampere pulse in the opposite direction, the direction of the magnetic field through the figure eight winding 2 is reversed, and as the magnetic field cutting through the sense winding 3 is reversed, a voltage is induced therein which is applied to the sense amplifier 5. The sense amplifier 5 is any suitable circuit for detecting the presence of binary information signals of positive or negative polarity or both, but in any event the output should be indicative of the information signals sensed. For example, positive information signals detected may indicate binary one, and negative information signals detected may indicate binary zero. Alternatively, the sense amplifier may detect only signals of a given polarity, and such signals may be arbitrarily designated as representating either binary one or binary zero. For example, positive signals only may be detected and arbitrarily designated as binary one. In such case the absence of a positive signal may be designated as binary zero. One suitable circuit, pointed out more fully hereinafter, employed for the sense amplifier 5 employs a differential amplifier having several stages of amplification with the two outputs connected to individual cathode followers having a common cathode resistance. In a circuit of this type, positive output pulses from the sense amplifier 5 are generated each time there is a change in magnetic field cutting the sense winding 3. With this scheme employed for sensing it is desirable to employ a strobing circuit for the purpose of eliminating the passage of signals generated in the sense winding when a magnetic field is changed in a given direction. More specifically, the signals generated in the sense winding during a write period are prevented from generating an output to some load device, whereas a signal, if any, generated by a change in flux in a sense winding during a read operation can be detected by the strobing circuit. Therefore an output signal from a strobing circuit may be designated as representing either a binary one or binary zero, and such an output pulse is generated if, and only if, the stored condition represents the given binary information.

It is appropriate at this point to follow a step by step procedure in illustrating the operation of the device in FIG. 1. If a positive pulse is applied to the figure eight winding 2 by the pulse generator 4, the resulting magnetic field penetrating the film 1 may be said to be in a direction representing binary one. The resulting voltage induced in the sense winding 3 may be in a negative direction as applied to the sense amplifier. In this instance the sense amplifier 5 is not strobed, so there is no output therefrom. This represents a writing operation. If it is desirable to read the information at some future time, a pulse of negative polarity may be applied to the drive winding 2 by the pulse generator 4. Whereupon a magnetic field of opposite direction through the figure eight winding is established; the field being reversed induces a voltage in the sense winding 3 which is supplied to the sense amplifier 5. The sense amplifier 5 is strobed during this time, and the signal on the sense winding is detected and supplied as an output pulse representative of binary one.

In writing a binary zero, the pulse generator 4 supplies a negative pulse to the figure eight winding 2 which establishes a magnetic field through the loops of the figure eight winding in a direction opposite to that which represented a binary one. If prior to a writing operation the persistent current in a cell is in a direction to represent a binary zero, the writing of a binary zero by a negative pulse from the pulse generator 4 would cause very little, if any, voltage to be induced in the sense winding 3. The polarity of such induced voltage is positive, but no output is yielded by the sense amplifier 5 because there is no strobing during a writing operation. The reading of a zero can be such that no signal is generated in the sense winding 3, giving the advantage of an infinite signal to noise ratio. Any operation, whether reading or writing, which tends to establish a condition already existing in a cell may be such as to produce no signal in the sense winding. For a better understanding of some of the principles involved in attaining this desirable effect, perhaps a discussion of the behavior of current in a ring versus applied field is helpful.

Figure 7:
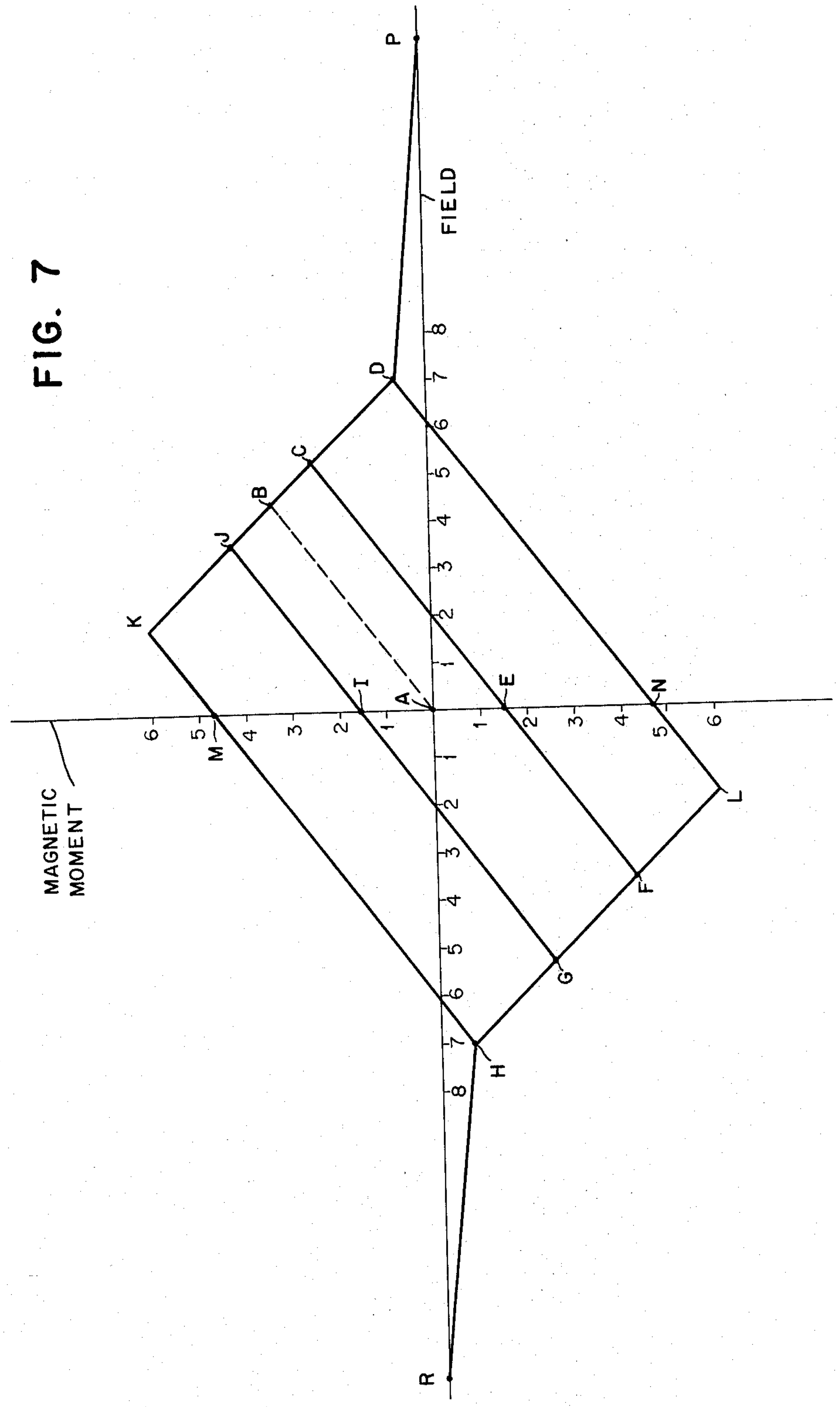
FIG. 7 shows a curve which indicates the behavior pattern of persistent currents in a ring under the influence of an external magnetic field.

Referring to FIG. 7, an idealized version of the magnetization curve of a superconductive ring is represented which is similar to that shown in Shoenberg, cited above. While this curve may not represent exactly the magnetization characteristic of applicant's cell, it is felt that it is of some value in directing attention to some of the underlying principles involved. The magnetization characteristic of applicant's cell will be assumed, with some reservation for error, as like that indicated in FIG. 7 for the purpose of presenting a simplified discussion of what may take place in applicant's cell. Values along the ordinate represent the magnetic moment which may be expressed in terms of current in the cell, and values along the abscissa represent applied external field which may be expressed in terms of current in the drive winding means. Current values along the ordinate represent persistent current i.e. current persisting in a cell in the absence of an applied magnetic field. Assuming that a cell is made superconductive and that no circulating current exists therein, its condition is represented by point A in FIGURE 7. As increasing current is supplied to the drive winding means in one direction, the state of the circulating current in the cell increases along the lines AB until the point B is reached at which point the persistent current in the cell decreases along the lines BCD. Assuming that the pulse is terminated after the amplitude represented by the point C is reached, the state of the circulating current in the cell decreases along the lines CE to the point E. Thus it can be seen that under these conditions, a steady state of persistent current represented by the point E is obtained after the current is terminated in the drive winding means. The action thus far may represent a writing operation, and the peristent current indicated by point E may be designated as binary one or zero. For purposes of illustration, assume the current indicated by point E is designated as binary one. In order to perform a read operation, an increasing current is applied to the drive winding means in a direction opposite to that applied during the write operation. The persistent current in the cell then increases negatively along the line EF EF until point F is reached where the persistent current begins to decrease toward zero along the line FGH. If the pulse is terminated after reaching an amplitude represented by the point G, the circulating current in the cell decreases to zero, then increases in a positive direction along the line GI until the point I is reached. The change indicated along the lines EFGI represents the operation of reading a binary one. The steady state condition of persistent current in a cell represented by the point I is designated as binary zero in view of the foregoing assumption that the condition represented by the point E is designated as binary one. A voltage is induced in the sense winding of a cell during that part of a change represented along the line FG during a read operation. If a current pulse of the same amplitude and direction as that described previously for writing a one is now applied to the drive winding of a cell, the persistent current changes as indicated along the lines IJC, and when the above pulse is terminated, the persistent current changes as indicated along the line CE as the external field collapses and reaches the steady condition for binary one represented by the point E. A voltage is induced in the sense winding of the cell during the time the circulating current is changing as indicated along the line JC. If persistent current in a cell is that current represented by the point I when a negative current pulse is applied to the drive means, the change in the persistent current is along the line IG to the point G provided the amplitude of the drive current is the same as that previously assumed for a reading operation. When the negative current pulse to the drive means is terminated, the persistent current changes along the line GI to the point I. Thus it may be seen that during a read zero operation no voltage is induced in the sense winding because there is no change in persistent current along the line GF. In practice, however, it may be difficult to terminate a pulse in the drive winding at the precise value indicated by point C for a writing operation and point G for a reading operation. Hence there may be some small change along the line GF when reading a zero and some small change along the line CJ when writing a binary one where the binary one condition exists. To the extent there is some change along the line GF or CJ, a noise or unwanted signal is induced in the sense winding of a cell. However, such noise or unwanted signal is very small, and with good amplitude regulation in the pulse source or driving equipment, the noise signal is made insignificant.

Current within a superconductive ring may persist indefinitely as long as it is any value within the region defined by D K H L D. The maximum persistent current in zero external field is indicated at M and N. External field influences current amplitude in a superconductive ring such that the changes in such current amplitude lie along lines parallel to LD and HK such as lines IJ, CE, EF or GI as illustrated above, for example. Once the amplitude of the current reaches a value represented on boundary lines DK or LH, any change thereafter must presumably assume values indicated on these lines. It is along these boundaries that current changes in a cell can be detected in the sense device, indicating that there is no net change in flux through the sense winding until the boundary condition is met. Typical of such changes from the foregoing illustration are changes along JC and FG. The lines DK, KH, HL and LD define ultimate boundaries of values which current in a ring may assume, beyond which the pure superconductive state is lost. External fields greater than that indicated at D or H cause the superconductive ring to enter the intermediate state which is indicated along line DP for magnetic fields in one direction and along line HR for magnetic fields in the opposite direction. Once the external magnetic field reaches a value equal to or greater than that indicated by P or R, the ring becomes completely normal; an electric field is restored; and any induced currents are dissipated as Joule heat. In other words, any induced current is dissipated by the resistance of the ring as a heat loss.

Referring again to FIGS. 1 and 2, assume that the current in each cell follows some variation which is assumed for purposes of illustration to be along the parallelogram indicated by I J C E F G I during read and write operation. It should be borne in mind that the curve of FIG. 7 represents current variation in a ring, that applicant's cell is not a simple ring and that the characteristic curve of FIG. 7 is employed for an approximate analysis rather than an exact analysis. The minimum current in the driving means necessary to cause reading or writing operation in the devices of FIGS. 1 and 2 is minus or plus 5.25 units, respectively, which is indicated along the abscissa in FIG. 7 as the field presented by points G and C, respectively. The minimum amplitude of current in the driving means is normally exceeded in practice by some factor which insures that with the limitation of the driving circuits, at least this much current is supplied to the respective drive lines. However, the current in the X Y or Z lines of partially energized cells must not exceed plus or minus 3.50 units of current indicated by the points J and F in FIG. 7 for respective write and read operations. To exceed this value of current would result in an unwanted signal being induced in the sense winding at a non-selected cell.

As explained previously the critical temperature with zero field is preferably high for the superconductive material 6 in FIG. 2 relative to the critical temperature in zero field of the superconductive material 7. For this reason it should be pointed out that at the operating temperature the maximum field intensities employed for control purposes must be less than the critical field of the material 6 in FIG. 2 or material 14 in FIG. 3 but greater than critical magnetic field of the respective materials 7 in FIG. 2 or the C line material in FIG. 3. Illustrating with respect to FIG. 2, one suitable combination is niobium for the material 6 and a lead-tin alloy for material 7. Another combination is lead for the material 7 and a lead-tin alloy having characteristics preferably as low as, if not lower than, that shown in FIG. 6. With extremely low operating temperature, somewhere in the neighborhood of 3° K. or lower, the number of suitable materials that may be employed for the material 7 is increased, for then alloys such as lead and thallium (2.2–7.3° K.), thallium and magnesium alloy (2.75° K.), lead and gold alloy (2–7.3° K.) as well as other alloys and compounds may be used as material 7 in combination with lead or niobium as material 6. The above combinations of materials may be similarly employed in the construction of FIG. 3. When used with lead, the alloys are chosen which go superconductive at the lower limit of the range of temperatures indicated in parentheses. In practice the choice of material is determined by the availability of the material as well as the ease with which it may be vacuum metalized. Also involved in the selection of materials for a cell is the speed with which the transition from the normal to the superconductive state or vice versa can take place, the limitation of the driving equipment to supply necessary current for exceeding the critical field of the material involved, and the temperature at which the device is operated.

Referring again to FIG. 3, assume a 2:1 selection scheme is employed to perform read and write operations. In order to prevent unwanted signals from being induced in the sense winding 20 in FIG. 3 by the action of the magnetic fields of selected X and Y lines on non-selected cells, the magnetic field of the individual drive line must be less than that indicated by J or G in FIG. 7 if all cells are being operated on the parallelogram I J C E F G I; that is, the magnetic field must be less than indicated by J and G in FIG. 7 for the C line or cross bar material of the cells represented by the superconductors labeled $C_1$, $C_2$, $C_3$ and $C_4$. The magnetic field produced by the combined effect of current in a selected X line and a selected Y line at their coordinate intersection must be greater than the critical field of the C line, or cross bar, material of the selected cell. Operated on the parallelogram I J C E F G I, a selected cell must have an applied field such as that indicated at G or C, depending upon whether the operation is read or write. To illustrate further, assume that the drive lines Y–4 and X–1 in FIG. 3 are energized with a current pulse in the positive direction for a write operation, that the cells are operated on the parallelogram I J C F G I and the selected cell (X–1, Y–4) is in the zero state with a persistent current represented by I in FIG. 7. In order to write a one i.e. change the direction of persistent current to that indicated by E in FIG. 7, it is necessary to apply and remove a magnetic field of the magnitude represented by C to the selected cell. The persistent current in the selected cell is then caused to change from the zero state I in FIG. 7 along IJ, JC and CE to the binary one state E. It is desirable in the 2:1 selection scheme to divide the drive line currents equally so that half of the required magnetic field at the selected cell is provided by the current in the X–1 line and the remainder by current in the Y–4 line. To secure a total field of 5.25 units, represented by C in FIG. 7, at the selected cell with the X–1 and Y–4 lines, each line must provide 2.625 units of current. With 2.625 units of current in the X–1 line producing a magnetic field which aids that produced by 2.625 units of current in the Y–4 line, it can be seen that the total magnetic field on the selected cell X–1, Y–4 is equal to the magnetic field indicated at C in FIG. 7 which causes the persistent current in the selected cell to change from I along IJ to J, then along JC to C; upon termination of the drive current in the X–1 and Y–4 lines, the current in the selected cell changes from C in FIG. 7 for full value of applied field along CE to E as the applied field decays to zero. The selected cell in zero external field is left with a persistent current indicated at E in FIG. 7 which is about 1.5 units on the ordinate, and the writing operation is completed. Partially selected cells in FIG. 3 lying along the X–1 line i.e. X–1, Y–3; X–1, Y–2; X–1, Y–1, and others lying along the Y–4 line i.e. Y–4, X–2; Y–4, X–3; Y–4, X–4 are provided with a field created by the 2.625 units of current in the respective X–1 and Y–4 lines, but the magnetic field in each instance is less than that indicated at J in FIG. 7. Thus no signal is induced in the sense winding 20 of FIG. 3 by the partially selected cells because the condition represented at J on the boundary line KD in FIG. 7 is not reached which boundary condition it is recalled, is essential before a signal can be induced in the sense winding. The only signal induced in the sense winding 20 of FIG. 3 during the above described writing operation occurs during the excursion of current in the selected cell as it changes in the manner indicated along that portion JC of the boundary line KD in FIG. 7, but such induced signal is without effect since there is no strobing operation during a write period. Furthermore a unilateral conducting device may be connected with the sense winding 20 in FIG. 3 to inhibit current flow as a result of this induced signal if strobing is not used. Once the writing operation is completed, the induced current represented at E in FIG. 7 may persist indefinitely in the selected cell as long as the operating temperature is maintained sufficiently low to continue the non-resistive state.

Assuming for purposes of illustration that it is desired to perform a read operation on the above described cell, negative current pulses of 2.625 units are simultaneously applied to the X–1 and Y–4 lines in FIG. 3. The magnetic field resulting at the selected cell from the currents in the X–1 and Y–4 lines is that indicated at G in FIG. 7. Since the read currents are reversed with respect to the write currents, the fields are also reversed. The combined effect of the read currents causes the current in the selected cell X–1, Y–4 of FIG. 3 to change from that indicated at E in FIG. 7 along the line EF to F, then along FG to G; upon termination of the current pulses in the X–1 and Y–4 lines, the persistent current changes from that indicated at G in FIG. 7 along GI to I as the applied field decays. During the change along the boundary line FG, a voltage is induced in the sense winding 20 of FIG. 3 which is opposite in polarity to that induced during the writing operation. There is a strobing or sampling operation of the sense amplifier during a reading operation, and the signal induced in the sense winding is detected and supplied as an output pulse, representative of a binary one. If strobing is not used, a unilateral conducting device may be connected with the sense winding 20 in FIG. 3 to allow current flow which may represent a binary one. Partially selected cells along the X–1 and Y–4 lines induce no noise signals in the sense winding 20 of FIG. 3 because the magnetic fields created by the negative 2.625 unit currents fail to change the current in these cells to the boundary condition represented at F in FIG. 3. It should be noted here that the current in partially selected cells may undergo some change as the result of a 2.625 unit current during a read or write operation. Once the 2.625 unit current is removed, however, the current is restored to that value which existed prior to partial selection. Thus it can be concluded that partial selection has no deleterious effect on the energy stored in a cell.

Considering here the effect of a reading operation on a cell which is in the zero state represented by a persistent current indicated at I in FIG. 7, assume that read currents are simultaneously applied to the X–1 and Y–4 lines. The net field of negative 5.25 units on the selected cell causes the persistent current of the cell to vary from that indicated at I in FIG. 7 along the line IG to G, and upon termination of the currents in the X–1 and Y–4 lines of FIG. 3, the persistent current in the selected cell changes from G in FIG. 7 along GI to the initial value indicated at I. If there is no change of the current in the cell along boundary line GF in FIG. 7 during the read operation, no noise or unwanted signal is induced in the sense winding 20 of FIG. 3. To the extent that there may be some change in persistent current along the boundary line GF in FIG. 7, a noise or unwanted signal is induced in the sense winding 20 of FIG. 3. The magnitude of an induced signal, if there is any, is extremely small, and it may be attributed to the inability of the pulse generators or driving equipment to deliver precisely 2.625 units of current. Again it can be seen that partially selected cells establish no noise signals in the sense winding 20 of FIG. 3. Thus it may be concluded that for reading operations involving any cell in the zero state, little or no noise signal is induced in the sense winding.

Considering next the effect of a writing operation which involves writing a binary zero in a cell where the zero state exists, assume that write currents are applied to the X–1 and Y–4 lines. Unless some inhibiting action is taken, the selected cell changes from I along IJ to J, then from J along JC to C and continues from C along CE to the binary one state at E as the applied field is removed. In order to prevent the persistent current in the selected cell from being driven to the binary one state, however, either of two alternatives may be taken. First, the Z line may be energized simultaneously with the X–1 and Y–4 lines with a current which establishes a magnetic field in a direction to oppose the magnetic field of the X–1 and Y–4 drive lines. Since the net field at the selected cell must be less than that indicated at J in FIG. 7 in order for the persistent current to return to the value representative of a binary zero as indicated at I, the magnitude of the magnetic field produced by the opposing Z line current must be at least equal to the value indicated at C minus the value indicated at J i.e. 5.25–3.5 or 1.75 units in this case. In practice it is desirable to avoid close tolerances, and Z line current of 2.625 units is preferably used. With 2.625 units of current applied to the X–1, Y–4 and Z lines simultaneously, the persistent current in the selected cell changes from I along IJ to a value less than that of J i.e. out to about plus 2.625 units of applied field in this instance. Upon termination of the X–1, Y–4 and Z line current, the persistent current in the selected cell changes back along the line JI to I. During the writing operation cells located on the X–1 line receive a net magnetic field equal to the difference between that established by the X–1 line and the Z line i.e. zero net field where, as here assumed, the two fields are equal in magnitude but in opposition. Likewise, the net magnetic field on the cells located on the Y–4 line is zero because the Y–4 line and Z line currents produce equal but opposite magnetic fields. All cells not associated with the X–1 or Y–4 lines receive a magnetic field equal to that established by the Z line current i.e. 2.625 units in a direction opposite to that of the X–1 or Y–4 magnetic field. During this writing operation the changes in the current in the various cells of FIG. 3 are summarized as follows: the current in the selected cell (X–1, Y–4) changes from the value indicated at I in FIG. 7 along IJ to a point where the field is plus 2.625 units and returns along JI to I when the magnetic field is removed; the persistent current in other cells located on the X–1 line and Y–4 line in FIG. 3 remains at the value indicated at I in FIG. 7; and the persistent current in all remaining cells in FIG. 3 changes (1) from the value indicated at I in FIG. 7 if a zero is stored along IG to a point where the field is minus 2.625 units and returns along GI to I when the magnetic field is removed or (2) from the value indicated at E in FIG. 7 if a one is stored along EF to a point where the field is minus 2.625 units and returns along EF to E when the magnetic field is removed. Thus no noise signal is induced in the sense winding 20 of FIG. 3 during a writing operation involving the writing of a zero where a zero exists. Second, the writing of a zero in a cell where a zero exists may be accomplished simply by failing to energize either the X–1 line or the Y–4 line or by energizing neither of them. In the latter case there is no change in persistent current of the selected cell, and in the former cases, the changes are similar to that described above with respect to the inhibit action of the Z line.

Consider next the effect the sense winding 20 of FIG. 3 has on reading and writing operations. The sense winding 20 is made of non-superconductive materials such as copper, silver or gold for example, which have relatively low resistance yet dissipate induced signals very readily. When changes in persistent current of a cell occur along JC in FIG. 7 during a writing operation or along FG during a reading operation, signal voltages induced in the sense winding 20 of FIG. 3 establish current flow which creates a magnetic field counteracting the magnetic field inducing the signal voltages. Without pursuing in great detail the consequence of the magnetic field around the sense winding 20 in FIG. 3, it can be seen that it may tend (1) to write in non-selected cells when reading a selected cell and (2) to read non-selected cells when writing in a selected cell. The magnitude of such interference can be made insignificantly small, however, if an impedance is serially related with the sense winding since reducing the current in the sense winding reduces the counteracting magnetic field thereof.

The foregoing consideration of a 2:1 selection system for reading and writing operations serves to clarify some of the difficulties relating to terminal equipment for energizing X, Y and Z lines. In a 3:2 selection system, on the other hand, coincident currents in three lines, i.e. X, Y and Z lines of FIG. 3, must provide a combined magnetic field of plus 5.25 units for writing and minus 5.25 units for reading if a selected cell is to operate on the parallelogram I J C E F G I in FIG. 7. Assuming operation on this parallelogram, then the magnetic field provided by each drive line is 5.25 units divided by 3 which is 1.75 units per drive line if the total field is equally divided. It can be seen that (1) the magnetic field at a selected cell is plus 5.25 units for writing operations and minus 5.25 for reading operation, (2) the magnetic field at a cell on the selected X or selected Y line is plus 3.5 units when writing and minus 3.5 units when reading, and (3) the magnetic field at all remaining cells is plus 1.75 units when writing and minus 1.75 units when reading. A field of 3.5 units in either the plus or minus direction can be tolerated because, as shown in FIG. 7, this value does not exceed the value indicated at J or F for respective write and read operations. If noise in the sense winding from non-selected cells is to be prevented, the field must not exceed 3.5 units in the assumed illustration. There is no possibility of noise from non-selected cells where the magnetic field of only plus or minus 1.75 units is involved.

From the foregoing considerations of a 2:1 selection system or 3:2 selection system, it can be concluded that no added energy is stored in a cell where, as in a partially selected cell, the current change does not exceed the values indicated at J or F in FIG. 7. In the instant invention this serves to minimize heat losses. Furthermore, there is no noise voltage induced in the sense winding if the values indicated at J and F are not exceeded, thereby making it possible to have an unlimited number of cells per single array. This is based on the assumption that the cells in a memory plane are normally limited to that number where the noise signals of partially selected cells collectively provide a net noise signal which renders detection of the desired signal of the selected cell impractical or unreliable.

Although the foregoing illustrations assume operation along the parallelogram I J C E F G I in FIG. 7, this is by way of demonstration only, and it is to be understood that operation is permissible on other regions of the curve. The operating region may include any parallelogram the ends of which lie along KD and HL and the sides of which are parallel to HK and LD. The parallelogram operated on need not be symmetrical about the zero axes of the ordinate and abscissa as is the case with parallelogram I J C E F G I. For example, the operating parallelogram may be M K J I G H M where M may represent the binary zero state and I the binary one state. Although persistent currents represented by M and I are in the same direction, it is noted that a relative increase or decrease in value of such currents is effective to induce signals in the sense winding of a cell having polarity and amplitude similar to that for changes in direction of persistent current from I to E or vice versa. However, the amplitude of read and write pulses varies when a cell is operated on the parallelogram M K J I G H M for it can be seen that a write pulse of 3.5 units changes the cell from M to K to J then to I upon release of the pulse; whereas a read pulse of 7 units is required to change the cell from I to G to H and then to M upon termination of the pulse. The ultimate boundaries for operating any cell in the superconductive state are defined by the parallelogram K D L H K since magnetic fields greater than that indicated at D or H create normal regions within a cell which permit current dissipation. As magnetic field intensities are increased toward the values indicated at P or R, the persistent current in a cell is further dissipated by increasing normal regions until at the values of P or R current is dissipated to zero by complete restoration of the normal state. It is permissible, however, to operate a cell in the regions DP or HR, but it appears heat losses may increase as the region of operation is expanded toward the ultimate limits P and R.

From the foregoing discussion of a two dimensional array, it is seen that numerous arrays of this type may be stacked, forming a three dimensional memory system. In such event the Z lines may be used to select which planes are to be read, for example, and they may be used to inhibit or permit the writing of binary information during a write operation.

Some further useful functions, other than the storage function, are obtainable with the cells of the present invention. A cell of the type employed in FIG. 8, for example, may include two or more inputs which serve as a logical AND circuit or as a logical OR circuit.

Figure 8:
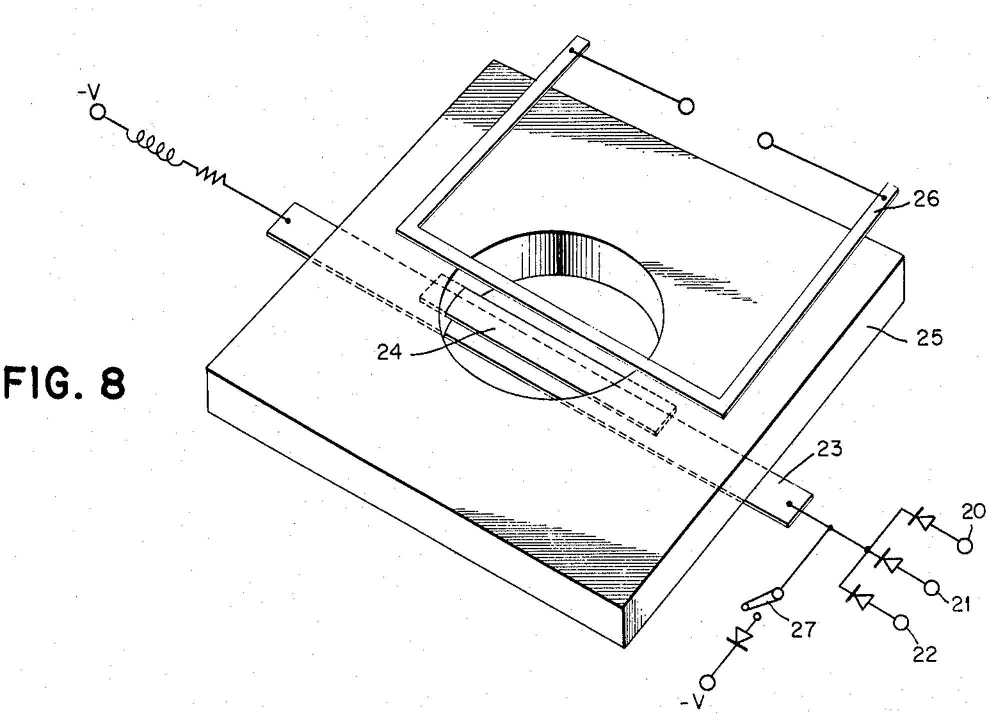
FIG. 8 illustrates a logical AND circuit and a logical OR circuit constructed according to the present invention.

Employed as a logical AND circuit or as a logical OR circuit the cell of FIG. 8 should have initially a persistent current established in a given direction, called the reset condition. The cell must receive individual currents simultaneously through input terminals 20, 21 and 22 if used as a logical AND circuit. When additively combined in the drive line 23, these currents create a magnetic field of a given intensity around the drive line that is applied to the thin strip 24 which bridges the aperture in and makes electrical contact with the thin superconductive material 25. If the applied magnetic field creates a change in current in the cell which involves a change along the boundary KDP or LHR in FIG. 7, an output signal is induced in the sense winding 26. To insure that a detectable change in current occurs each time that all three input terminals 20 through 22 are energized simultaneously with sufficient currents, a switch 27 is closed beforehand and then opened; the amplitude of the resulting current pulse in the drive line 23 is sufficient to establish a circulating current in the superconductive material 25 in a given direction representing the reset condition. Current flow in the drive line 23 established by closing the switch 27 is in a direction opposite to current flow in this drive line when current is supplied thereto from terminals 20 through 22. Thus it is seen that an output signal is established in the winding 26 whenever three currents applied to input terminals 20, 21 and 22 create a sufficient field around the drive line 23 to change the circulating current within the superconductive material 25 from the reset condition to a current which differs in either amplitude or direction, providing there is a detectable change in current i.e. along KDP or LHR in FIG. 7. The switch 27 must be opened and closed each time before the cell is operated as an AND circuit.

When used as a logical OR circuit, the cell is reset by closing and opening the switch 27, and a current is then applied to any one of the terminals 20 through 22. The amplitude of an individual current supplied to the input terminals must be sufficient to cause a change of current in the cell along the boundary KDP or LHR in FIG. 7. Hence a signal is induced on the sense winding 26 whenever any one of the terminals 20, 21 or 22 is energized with a sufficient current.

In order to perform a reset operation automatically and use the cell for logical AND and OR purposes, an alternative scheme is to leave the switch 27 closed and use correspondingly larger currents at input terminals 20 through 22. That is, a bias or reset current is made to flow continuously, and its amplitude is made sufficient to effect the reset condition in the absence of a current from the input terminals 20 through 22. Correspondingly, the current through the input terminals must be increased in amplitude sufficient (1) to overcome the opposing effect of the constant bias and (2) to effect a detectable change of current in the cell. Assume, for example, that a current of $-I$ resets the cell and a current of $+I$ effects a detectable change of current in the cell when alternately applied, then $-I$ may be supplied constantly by the reset circuit with the switch 27 closed and $+2I$ may be supplied to the input terminals 20 through 22 to accomplish the AND and OR functions. Whenever current from the input terminals 20 through 22 is removed or falls below a given amplitude, the bias current automatically effects a reset condition.

Figure 9:
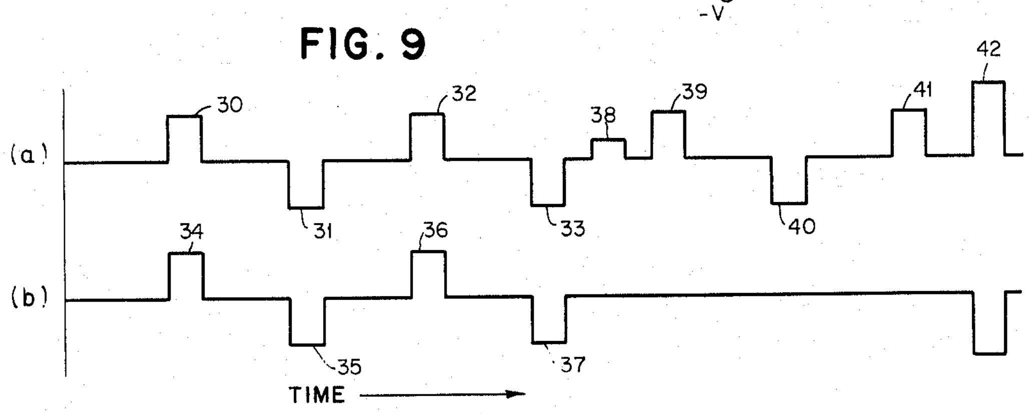
FIG. 9 illustrates a set of current wave forms which indicate how the cell of FIG. 1 may be operated as a switch device.

It was discovered that the cell of the present invention can perform a unique switch function. If the pulse source 4 in FIG. 1, for example, supplies current pulses such as indicated by (a) in FIG. 9 to the drive winding 2, signals such as indicated by (b) in FIG. 9 are developed on the sense winding. The pulse shapes are idealized in FIG. 9 for ease of illustration, and the amplitude of each drive pulse is sufficient to create a detectable change in current in the cell. Pulses 30 through 33 (FIG. 9) from the pulse source 4 (FIG. 1) create signals in the sense winding 3 as indicated by the respective pulses 34 through 37 (FIG. 9). If a current pulse of relatively small amplitude such as pulse 38 in FIG. 9 is applied to the drive winding 2 of FIG. 1, no further signals are thereafter detected in the sense winding 3 even though subsequent current pulses such as indicated at 39 through 41 in FIG. 9 are applied to the drive winding. Hence it can be seen that the cell of the present invention may serve as a gate or switch device which permits a source of pulses to pass. The switch may be said to be closed. If a small pulse, such as indicated at 38 in FIG. 9, is properly applied to the cell, no further pulses from the pulse source are passed. The switch may be said to be open. If a pulse of large amplitude, such as the pulse indicated at 42, is subsequently applied to the drive winding 2 in FIG. 1, the switch is again closed, and further pulses from the pulse source 4 can be detected in the sense winding. No explanation is known at this time which justifies the switching function. The switching function is reliable for varying pulse repetition rates.

Figure 10:
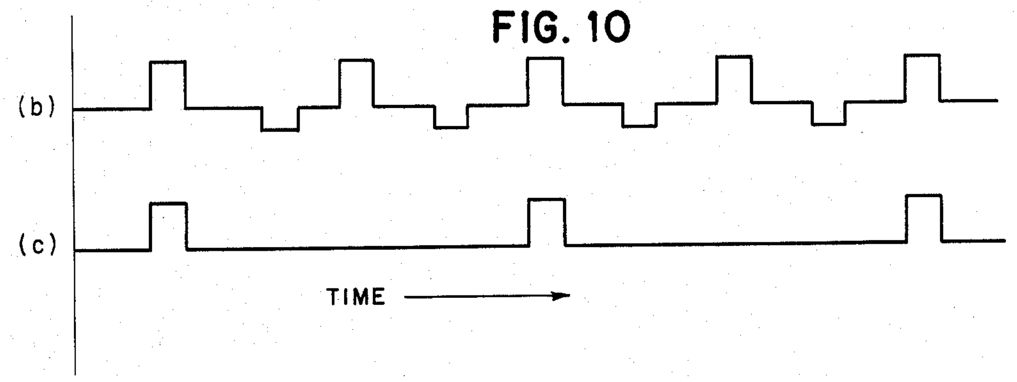
FIG. 10 illustrates a set of current wave forms which indicate how the cell of FIG. 1 may be operated as a frequency divider.

A further function which the cell of the present invention serves is that of a frequency divider. If a group of current pulses having amplitude and polarity such as indicated by (b) in FIG. 10 are supplied to the drive means of a cell such as winding 2 in FIG. 1, signals are induced in the sense winding as indicated by (c) in FIG. 10. It is noted that alternate ones of the positive pulses cause a signal to be induced in the sense winding. Thus the cell acts as a frequency divider for the positive pulses i.e. divides by two. By serially relating several cells, connecting the output of one cell to the input of another, division by a factor of 2, 4, 8 etc. can be secured. By varying the amplitude and width of the input pulses, the division by a factor of 2, 3, 4 etc. can be secured. Decreasing the amplitude of the drive pulses caused an increase in the division factor. The division factor remains constant in each case with a change in the pulse repetition rate.

Figure 11:
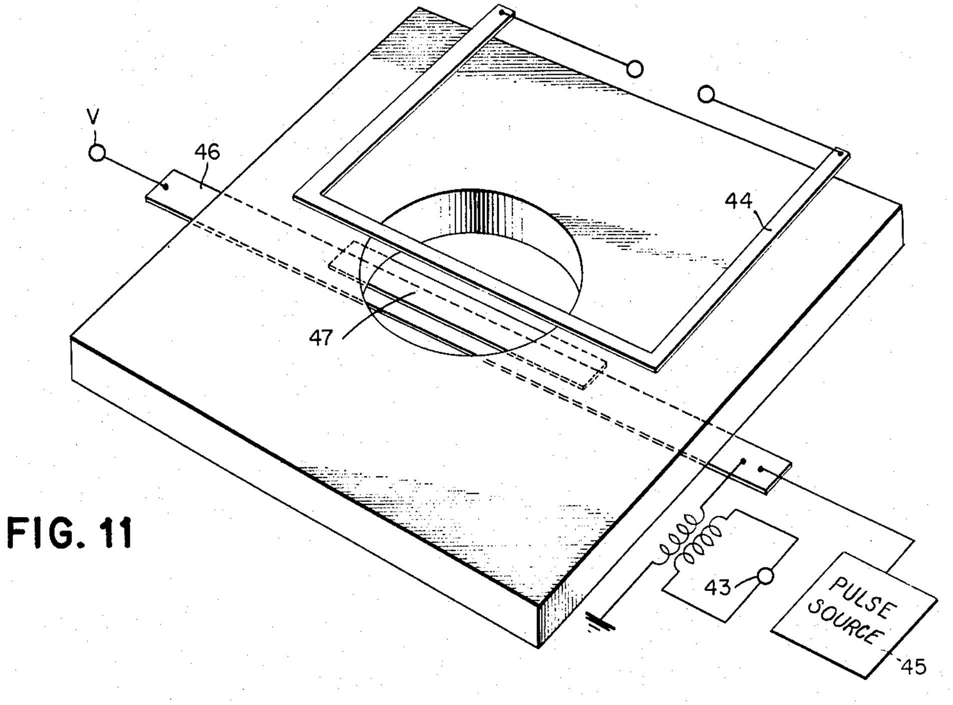
FIG. 11 illustrates a gate circuit constructed according to the principles of the present invention.
Figure 12:
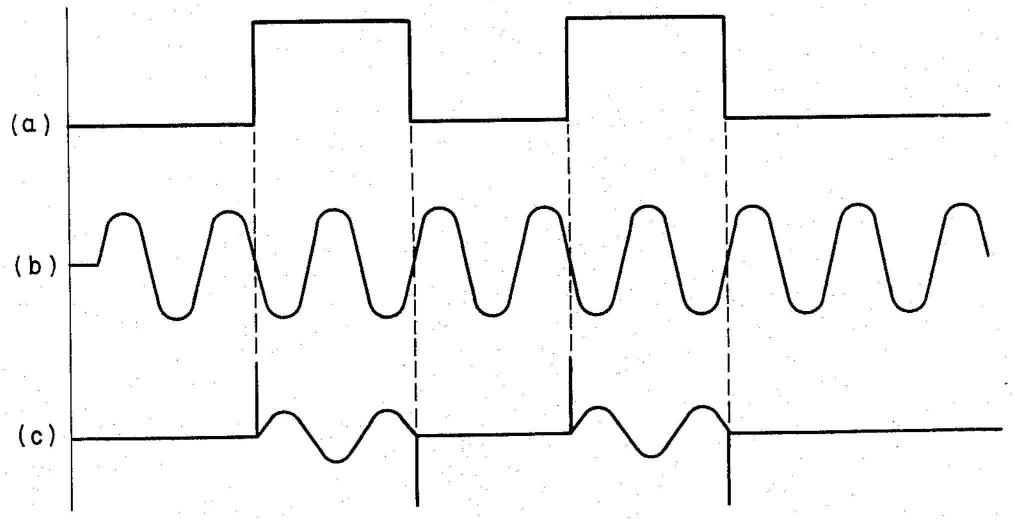
FIG. 12 illustrates a set of current wave forms which demonstrate the operation of the gate circuit of FIG. 11.

A further novel and unique arrangement of the present invention is illustrated in FIG. 11 which may be termed a coincident type of gate circuit wherein a source of signals 43 is permitted to appear on the output winding 44 whenever a pulse of predetermined amplitude, of either polarity, is supplied simultaneously by the pulse source 45. In this arrangement a pulse from the pulse source 45 is applied to a drive line 46 which produces a magnetic field on the thin strip 47 sufficient in intensity to equal or exceed a critical value. The critical value of the field is maintained for the duration of the current pulse. Positive pulses of this type are indicated by (a) in FIG. 12. If a source of signals 43, for example, sine waves indicated by (b) in FIG. 12, is applied to the drive line the signals appearing on the output winding 44 are signals of the type indicated by (c) in FIG. 12. The spike voltages preceding and succeeding each part of the passed wave in (c) result from the rise and fall of the square wave in (a) of FIG. 12. In this instance the signals from the source 43 are presumably coupled to the output winding 44 by virtue of transformer action because the current supplied by a pulse source 45 in the drive line 46 is sufficient to render the thin strip 47 normal or at least partly so. In the absence of a pulse from the pulse source 45 superconductivity is restored in the strip 47 and the amplitude of the signals from the signal source 43 are not sufficient to create a change of current in the cell along the boundary KDP or LHR in FIG. 7.

A further embodiment of a cell according to the present invention is illustrated in FIG. 13 wherein the various parts corresponding to similar parts in FIG. 2 are labeled with like reference numerals having the letter "*a*" affixed. The storage technique involves trapping magnetic flux lines within a portion of the area of a superconductive film by the coincident application of current pulses to X and Y drive lines. The X line and Y line and a sense winding **8*a* in FIG. 13 are insulated from each other and from a film of superconductive material 6*a*. The drive lines are disposed on the upper side of the film 6*a* and the sense winding 8*a* is disposed beneath the superconductive material 6*a*. The storage of binary information may be accomplished by establishing magnetic lines of flux which thread through the superconductive film 6*a*** in either of two directions which may be arbitrarily designated as binary one and binary zero. Such information may be retained indefinitely and interrogated when desired by establishing trapped magnetic flux in a direction representative of binary zero, for example, and observing the signal, if any, on the sense winding. If a signal is detected as a result of change in magnetic flux direction this may be designated as a binary one signal, and if there is no flux change and consequently no signal induced in the sense winding, this may be designated as binary zero.

To illustrate the operation of the cell of FIG. 13, assume that currents in either of two directions are applied to the X and Y lines by suitable equipment such as that shown in block form in FIG. 4. If a current flows to the left in the Y line and at the same time another current flows to the right in the X line, the magnetic fields established around the X and Y lines are individually less than the critical magnetic field of the superconductive material **6*a*, but at the crossover location of the X and Y lines, the X and Y fields create a resultant magnetic field having two components, a minimum and a maximum component in a substantially quadrature relationship. The minimum component of the magnetic field has an axis substantially parallel to the sense winding 8*a*; whereas the maximum component has an axis which is substantially perpendicular to the sense winding. The maximum component of the resultant magnetic field is equal to or in excess of the critical magnetic field of the superconductive material 6*a*. Regions or areas of the superconductive material 6*a* adjacent the X and Y crossover locations become resistive where the resultant maximum component of the magnetic field is equal to or in excess of the critical magnetic field of the superconductive film 6*a*, and magnetic lines of flux may then penetrate the film 6*a* through these resistive regions. A single loop 48 in FIG. 13 indicates generally the position of the axis of the maximum component of the resultant X and Y magnetic fields relative to the X, Y and sense conductors. It further indicates generally that the resistive areas include regions of the superconductor 6*a* which lie in and around the areas penetrated by the loop 48*a*. The arrowheads on the loop 48 indicate the circular direction of the resultant magnetic field. It is pointed out that the loop 48 is an idealized representation and that the fringing effect of the lines of flux of the maximum component of the resultant magnetic field makes it difficult to prescribe the exact pattern of resistive areas adjacent to the crossover location of the X and Y current carrying lines. However, some closed lines of magnetic flux of the resultant magnetic field, whatever the precise pattern, penetrate the superconductive film 6*a* through resistive regions adjacent to the X and Y crossover location. As soon as the currents are terminated in the X and Y conductors, the resultant of the X and Y magnetic fields external to the superconductive film 6*a* decays to zero. Superconductivity is restored in the process and lines of flux penetrating the superconductive film 6*a* tend to collapse; these magnetic lines of flux are unable to collapse through the superconductor and are virtually trapped. As long as the superconductive state of the material 6*a* continues, the trapped flux can be maintained captive. Trapped lines of flux in the direction indicated by the arrowheads of the loop 48** may be arbitrarily designated binary one. The operation of establishing flux lines in this direction may be disgnated a writing operation. The sense winding is fabricated of material which is normal at the operating temperature. Hence, the trapped lines of flux link the sense winding and induce a voltage therein. During a writing operation, however, the signal on the sense winding is not strobed or sampled. Thus this signal is not useful.

The minimum component of the resultant X and Y magnetic fields which is in quadrature with the maximum component has an axis which is parallel to the sense winding 8*a*. This component theoretically appears to be zero along an axis parallel to the sense winding 8*a*. At any rate it appears this component is less than the critical magnetic field of the superconductive film 6*a* and accordingly no flux is established through and trapped in superconductor 6*a* along an axis parallel to the sense winding 8*a*. Assuming however that due to the fringing effect of the magnetic flux lines, some lines of flux are established and trapped in the film 6*a* parallel to the sense winding 8*a*, no difficulties arise because such lines of flux being substantially parallel to the sense winding 8*a* induce no signal therein. Since the minimum component of the resultant X and Y fields is both weak and parallel to the sense winding 8*a*, little or no voltage is induced in the sense winding thereby, but the maximum component of the resultant X and Y magnetic fields being both strong and perpendicular to the sense winding 8*a* induces a substantial voltage therein. The maximum component is desirable because it is useful in accomplishing the storage function; whereas the minimum component of the resultant X and Y magnetic fields while undesirable is nevertheless present and can be tolerated because it is both weak and parallel to the sense winding 8*a*.

If a current flows in the X and Y lines opposite to the direction indicated by the arrowheads and of the same amplitude as that employed in the above described writing operation, the sequence of events is the same but the direction of the minimum and maximum components of the resultant X and Y magnetic fields is reversed. The maximum component of the resultant X and Y magnetic fields has an axis parallel to the axis of the loop 48 in FIG. 13; however the direction of the circular field is now opposite to that indicated by the arrowheads on the loop 48. When the current pulses are terminated, lines of flux penetrating the superconductive film 6*a* are trapped again. Flux in this direction may be designated as representing binary zero, and this may be designated as a reading operation. It is seen that a reversal in flux direction induces a voltage in the sense winding 8*a* because the trapped flux also encompasses the sense winding. The X and Y lines are preferably superconductors having a critical field which is much greater than the self field created by currents flowing therein for reading and writing purposes. Various logical and other functions secured with the cell of FIG. 1 and the modifications thereof described in FIGS. 8 through 12 are similarly secured with the cell of FIG. 13.

Figure 14:
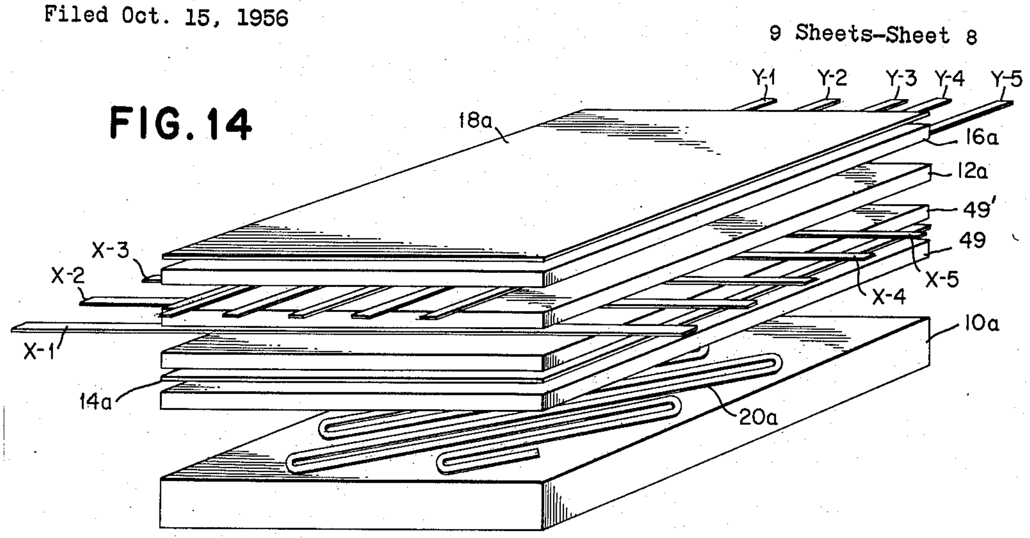
FIG. 14 illustrates a memory system incorporating the cellular construction of FIG. 13.

A further novel matrix arrangement incorporating the cellular construction of FIG. 13 is illustrated in FIG. 14 wherein the various parts corresponding to similar parts in FIG. 3 are labeled with like reference numerals having the letter "*a*" affixed. Although separated in the drawing for easier viewing of the structural arrangement, the various parts are made of thin films which form a compact unit with each film having a thickness on the order of the thin films used in the arrangement of FIG. 3. On a suitable substrate 10*a*, having good electrical insulation qualities and strength as a backing member, are mounted the various thin films and conductors which may be fabricated by vacuum metalizing or printed circuit techniques. A sense winding 20*a* mounted on the substrate 10*a* is insulated by a film of insulation material 49 from a film of superconductive material 14*a* which serves as the storage medium. The X drive lines are insulated from the superconductive film 14 by a film of insulation material 49, and the X and Y drive lines are insulated from each other by a film of insulation material 12*a*. A superconductive film 18*a* is insulated from the Y drive lines by a film of insulation material 16*a*. The critical magnetic field intensity of the superconductor 18*a* is essentially much higher at the operating temperature than the magnetic field intensities of the X and Y drive lines; hence it acts as a barrier or screen to these magnetic fields and confines the magnetic lines of flux therebelow. One desirable effect of the superconductor 18*a* is to reduce the mean free path of magnetic lines of flux around the X and Y lines thereby requiring less current to secure a given intensity of magnetic field around these lines. The critical magnetic field of the superconductor 14*a*, on the other hand, is relatively much lower than that of the superconductor 18*a*. Coincident currents in a selected X line and a selected Y line establish magnetic fields which are individually less than the critical field, but at a coordinate intersection or crossover location the combined strength, as pointed out previously, is sufficient to exceed the critical value of magnetic field. The magnetic field around a selected X line and a selected Y line is confined within a narrow mean free path between the superconductors 14*a* and 18*a* except at a coordinate intersection where the resultant field in excess of the critical field of the superconductor 14*a* breaks through and extends below this superconductor as previously explained. Consequently, undesirable energy losses of driving current are minimized within a unit of this type, and interference of magnetic fields between planes is eliminated when a plurality of units of the type shown in FIG. 14 are stacked one with another and the X and Y drive lines of each unit are interconnected to form a three-dimensional memory device.

For the purpose of writing and reading in a given location in the matrix array of FIG. 14, coincident currents are applied to a selected X line and a selected Y line. The magnetic fields established around the drive lines are individually less than the critical magnetic field of the superconductor 14*a* but collectively at the crossover location or coordinate intersections they exceed the critical magnetic field. Once the critical magnetic field is reached at a coordinate intersection, at least some area of the superconductor 14*a* therebelow goes normal or resistive, and magnetic lines of flux may then penetrate the film 14*a* and form closed lines of flux therethrough as pointed out above with respect to FIG. 13. Once the currents in a selected X and a selected Y line are removed, superconductivity is restored in the area or regions of film 14*a* adjacent a selected coordinate intersection and magnetic lines of flux are trapped in the film 14*a* along an axis substantially perpendicular to the sense winding 20*a*. If the currents in the drive lines are reversed, trapped flux in the superconductor at the selected coordinate intersection can be made to reverse and the change detected by a signal induced in the sense winding 20*a* which is constructed with material that is normal at the operating temperature.

Figure 15:
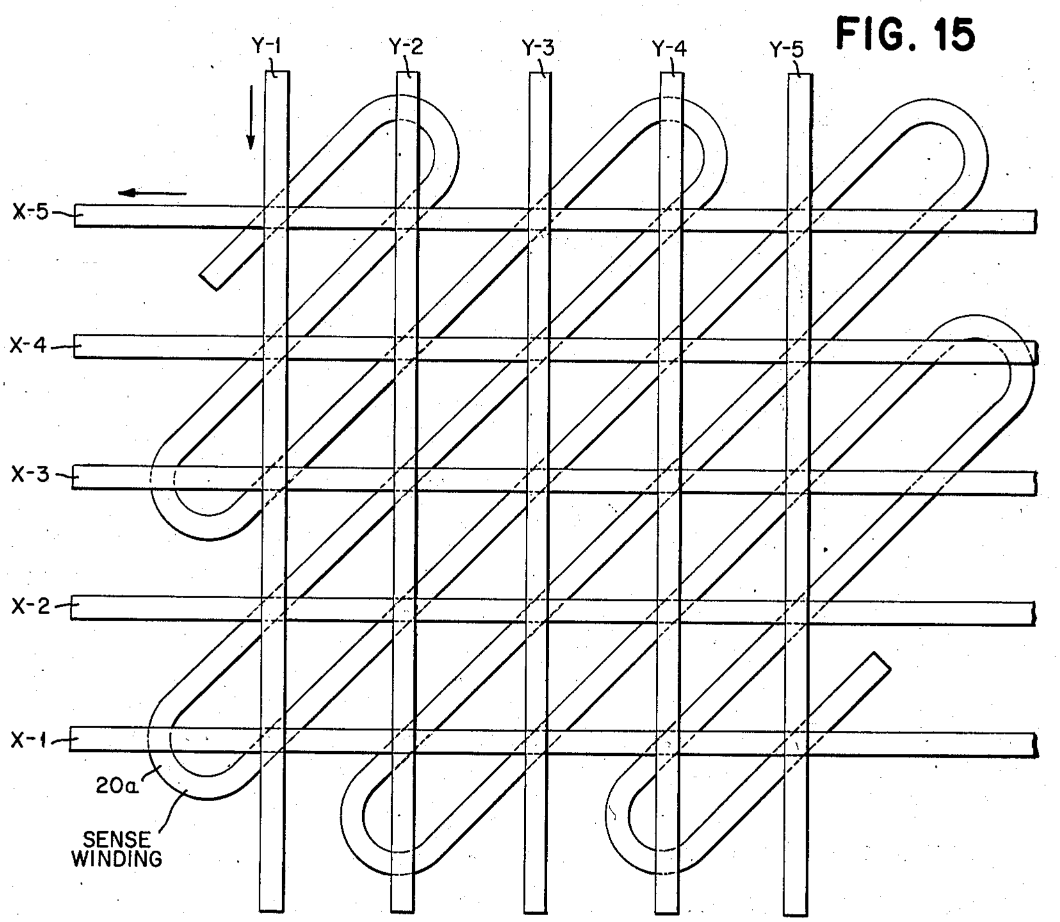
FIG. 15 is a plan view of part of the structure in FIG. 14 with the various films or plates omitted to show in greater detail one arrangement of X, Y and sense conductors.

The arrangement of the X lines and Y lines and the sense winding 20*a* is illustrated in greater detail in FIG. 15 wherein the various films in FIG. 14 are omitted. The X and Y lines are arranged to cross over perpendicularly at coordinate intersections; whereas the sense winding 20*a* crosses at a 45° relationship with respect to the X and Y coordinate intersections. If a current flows down the Y–1 line and another current flows to the left in the X–5 line as indicated by arrows adjacent these lines, it can be seen that a resultant magnetic field is produced at the coordinate intersection X–5, Y–1 which has a weak component parallel to the sense winding 20*a* and a strong component perpendicular to the sense winding 20*a*. The weak component of magnetic field is substantially zero along the direction of the sense winding 20*a* because of the opposing effect of the fields created by the current carrying drive lines. This component, as pointed out above, is present but not useful or harmful. The creation of the stronger component of magnetic field perpendicular to the direction of the sense winding 20*a*, however, exceeds the critical field of the superconductor 14*a*, causes some areas of the superconductor adjacent to the selected coordinate intersection to go normal, and lines of flux extend through the superconductor in the normal areas. If the currents in the X–5 and Y–1 lines are reversed, it can be seen that, similar to the above described action, the weak and strong components of magnetic fields are established in the reverse direction, but they lie in the same planes as before. Hence it is seen that magnetic lines of flux representative of binary information may be established in one direction and trapped in a selected location in a superconductor 14*a* of FIG. 14 for an indefinite period of time by pulsing the selected X and Y lines with current in one direction. This binary information may be read subsequently by pulsing the selected X and Y lines with current in the opposite direction and observing the signal, if any, on the sense winding 20*a*.

From the previous discussion of the read and write operations with respect to the apparatus of FIG. 13 it is readily seen that trapped magnetic flux lines in either of two directions at a selected coordinate intersection in FIG. 14 may be arbitrarily designated binary one and zero. For a read operation trapped flux lines of a selected bit may be established in the binary zero direction. If a binary one is read a signal is developed across the sense winding 20*a* as there is a reversal in direction of the magnetic flux lines of the selected bit; whereas little or no signal is developed across the sense winding 20*a* when a binary zero is read because there is no change in direction of the magnetic flux lines and substantially no change in the number of magnetic lines of flux threading or cutting the sense winding 20*a*. Current drivers for the X and Y drive lines and a sense amplifier for the sense winding 20*a*, not shown, may be of the type indicated in block form in FIG. 4 and described more fully hereinafter.

Various types of suitable pulse generating circuits, shown in block form in FIGS. 1 and 4, may be used for securing read and write pulses. One drive circuit which may be employed is shown in detail in FIG. 16. It is desirable to have the driver circuit provide a pulse of the proper width having a steep leading and trailing edge, sometimes referred to as the rise and fall times. The pulse generator 50 functions to yield a pulse of proper width and shape on an output conductor 51.

Figures 16, 17:
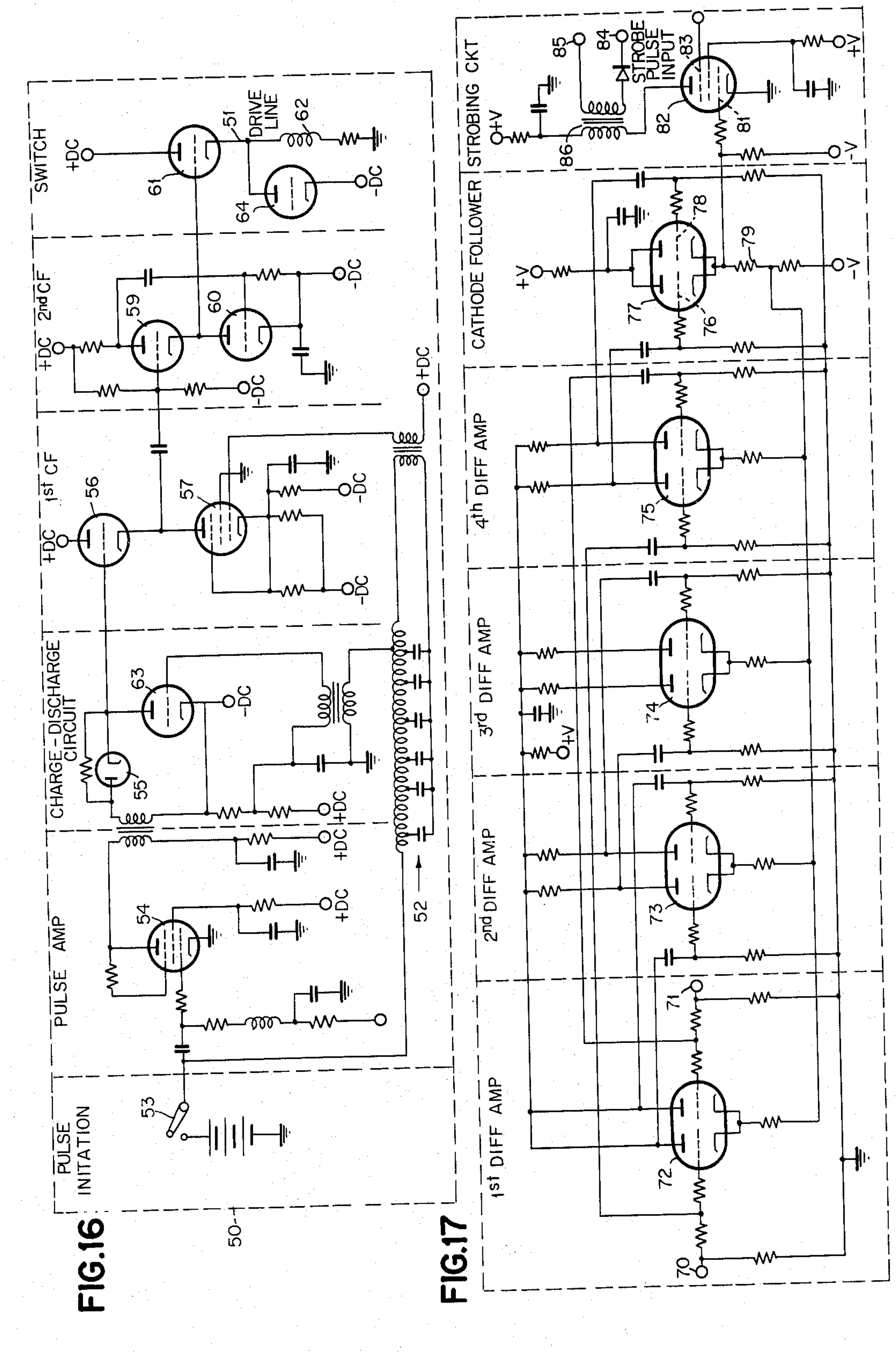
FIG. 16 is a wiring schematic of one type of pulse generator shown in block form in FIG. 4.
FIG. 17 is a wiring schematic of one type of sense amplifier device shown in block form in FIG. 4.

In the illustrative design of FIG. 16 the proper pulse width is secured by using a delay line 52 to terminate the output pulse a predetermined time after it is initiated. In order to provide initiation and termination of the output pulse with proper leading and trailing edges, six stages of control are employed as labelled. The first stage is a pulse initiation circuit where a pulse is created at the input of the second stage and a delay line 52 by closing and opening a switch 53. Although illustrated for convenience as a mechanical device, the switch 53 may be an electrical, electromechanical or an electronic device in practice. The second stage is a Pulse Amplifier which amplifies the input pulse in a pentode 54 and transformer couples the output to a third stage labelled Charge-Discharge Circuit. A diode 55 in this stage initially conducts and charges the capacity of the grid circuit of a vacuum tube 56 in a fourth stage labelled First Cathode Follower (1st CF). A vacuum tube 57 serves as the cathode impedance of cathode follower tube 56. The output of the first cathode follower stage is supplied to the input of a fifth stage labelled Second Cathode Follower (2nd CF). Included as the cathode impedance of a triode 59 of this stage is another triode 60 which is controlled by the anode voltage of the cathode follower triode 59. As the input signal to the grid of the triode 59 rises, the anode potential drops and causes the grid potential of the triode 60 to drop, creating a higher cathode impedance for the triode 59. Accordingly, the output signal to the grid of a switch tube 61 in the sixth stage rises rapidly, driving the switch tube 61 into conduction and giving a steep rise to the leading edge of the output current pulse. The output current of the sixth stage is supplied via the conductor 51 to a superconductive drive line 62 as a load. As soon as an input pulse traverses the delay line 52, indicating the output current pulse should be terminated, a pulse is transformer coupled from the right hand end of the delay line 52 to the pentode 57 of the first cathode follower stage, causing conduction in the pentode 57 and rapidly reducing the cathode resistance of the first cathode follower stage. This in turn causes the grid voltage of triode 59 in the second cathode follower to decrease rapidly and its anode voltage rises which rise is coupled to the grid of the triode 60, causing conduction and quick reduction of the cathode resistance of the second cathode follower stage. Consequently, the voltage on the grid of switch triode 61 is lowered very quickly, causing non-conducton, and the output current pulse is terminated with a very steep trailing edge. Slightly before the pulse from the delay line 52 causes the above sequence of events, a pulse is coupled from the delay line 52 to the grid of a triode 63 which causes conduction therein and discharges electrical energy stored in the capacity of the input circuit of the triode 56. This causes a reduction of the output voltage of the first cathode follower which further accelerates the sequence of events leading to termination of the output pulse. Thus it is seen that the pulse generator provides a sharply defined output pulse in response to an input pulse.

In order to supply current in the drive line 62 in a direction opposite to that supplied by the switch tube 61, a second pulse generator is employed having the first five stages identical to that described above. A switch tube 64 in the sixth stage of the second pulse generator is connected as shown in FIG. 16 with the drive line in the anode circuit thereof. Hence current flows in one direction through the drive line 62 when switch tube 61 conducts and in the opposite direction when tube 64 conducts. The amplitude of current in either direction can be controlled by controlling the amplitude of the pulse applied to the control grids of tubes 61 and 64.

The sense amplifier circuit illustrated in block form in FIG. 1 and FIG. 4 may include numerous forms in its logical arrangement and many variations in the component circuit details thereof. The particular circuit in any instance must in some manner distinguish desired from undesired signals. One circuit suitable for the purpose is illustrated in FIG. 17 as a six stage network with dotted lines used to define the general limits of each stage. The voltage from a sense winding such as winding 3 in FIG. 1, for example, is applied across input terminals 70 and 71 of a first stage labelled first differential amplifier (1st Diff. Amp.) in FIG. 17. As indicated by the labelling, the second, third and fourth stages are differential amplifiers with the output of each stage feeding to the next succeeding stage. The differential amplifier stages one through four include respective dual triode vacuum tubes 72 through 75 having left and right half-sections. Since the left half-sections are serially connected, it can be seen that a positive signal on the input terminal 70 undergoes voltage amplification in the various left half-sections of the differential amplifier stages and is presented as a positive signal to a control grid 76 of a dual triode 77 in the fifth stage. Similarly, a positive signal on the input terminal 71 is amplified in the various right half-sections and causes a positive signal on a control grid 78 of the dual triode 77. The fifth stage constitutes a cathode follower circuit wherein a positive signal on either the control grid 76 or the control grid 78 undergoes power amplification and is supplied as positive output signal from a cathode resistor 79 to a control grid 81 of a pentode 82 in the sixth stage labelled Strobing Circuit. The sixth stage is essentially an AND circuit wherein a positive signal on the control grid 81 and a positive signal on a screen grid 83 causes current conduction in the pentode 82; consequently a signal is developed across output terminals 84 and 85 of transformer 86 in the anode circuit of the pentode 82. By controlling the time at which a strobing pulse is applied to the screen grid 83 of the pentode 82, the passage of positive signals on the control grid 81 can be permitted or prevented. Hence the detection of undesired signals which may be generated in a memory cell during a write period can be prevented by failing to supply a strobe pulse to the screen grid 83, and the detection of desired signals during a read period can be permitted by applying a strobe pulse to this screen grid.

In order to secure some measure of automatic amplitude control, the output signal of the third differential amplifier stage is further supplied back to the input circuit of the first stage. This feedback not only lends added stability but widens the frequency response range which tends to narrow as the number of stages increases.

Thus it is seen that the sense amplifier circuit in FIG. 17 responds to a positive signal on either input terminal 70 or 71 to provide an output signal across terminals 85 and 84 provided a strobe pulse is applied, by some means not shown, to the screen grid 83 of the strobing circuit.

Some earlier theories relating to electrical and magnetic phenomena have undergone revision, in whole or in part, in view of more recent experiments involving superconductivity. It should be borne in mind, therefore, that any attempt on the part of applicant to theorize in the realm of superconductivity is intended primarily to direct attention to underlying principles, not to explain them. Therefore, the construction and use of the present invention does not depend upon the applicability, proof, or the validity of any theories alluded to herein.

While there have been shown and described and pointed out the fundamental novel features of the invention as applied to preferred embodiments, it will be understood that various omissions and substitutions and changes in the form and details of the devices illustrated and in their operation may be made by those skilled in the art without departing from the spirit of the invention. It is the intention therefore, to be limited only as indicated by the scope of the following claims.

What is claimed is:

1. A storage cell including a body comprising a film of material in the superconductive state having an aperture therein, a narrow member of material in the superconductive state mounted over the aperture in abutting relationship with said material, drive means associated with said narrow member for inducing therein a first persistent current having magnitude and direction in response to a first operating condition of said drive means and a second persistent current having magnitude and direction in response to a second operating condition of said drive means, said first persistent current differing from said second persistent current, and means associated with said narrow member for detecting a change from said first to said second persistent current.

2. A device including a superconductive material, first and second winding means operatively associated therewith, first pulse generator means for supplying a current pulse of one polarity to said first winding sufficient in amplitude to cause the magnetic lines of flux of said first winding means to exceed the critical field of adjacent portions of said superconductive material and render said portions normal whereby the lines of flux of said first winding penetrate said superconductive material through said adjacent portions and destroy superconductivity in said adjacent portions, currents being established and continuing as persistent currents as the current pulse from said first pulse generator means is terminated and superconductivity of said adjacent portions is restored, second pulse generator means associated with said first winding means which supplies a current pulse of opposite polarity and sufficient in amplitude to cause the magnetic flux of said first winding means to exceed the critical magnetic field of said adjacent portions and render said portions normal whereby the lines of flux in said first winding means penetrate said superconductive material through said adjacent portions, reverse the magnetic field thereof, and establish a current in the opposite direction in said adjacent portions, said second winding means being operatively associated with said adjacent portions of said superconductive material so that a change in the magnetic lines of flux penetrating said portions induces a current in said second winding means.

3. A switch device including a body of material in the superconductive state, a magnetic field producing means and a detector coupled to said body of material, a source of signals coupled to and operable to energize said magnetic field producing means, said magnetic field producing means responding to signals of given amplitude to establish signals in said detector, said magnetic field producing means responding to signals of relatively small polarity to prevent the subsequent establishment of signals in said detector in response to further signals of said given amplitude, and said magnetic field producing means responding to signals of amplitude greater than said given amplitude to again permit establishment of signals in said detector in response to further signals of said given amplitude.

4. In a memory device, a body of material in the superconductive state having at least a pair of apertures therein separated by an intermediate portion of said body of material, a first pair of conductive members, said pair of conductive members being positioned adjacent said intermediate portion of said body of material, means for energizing each of said conductive members with a current pulse insufficient alone to establish current flow around said pair of apertures and through said intermediate portion but effective where energized conjointly to establish such current flow.

5. The device of claim 4 wherein said intermediate portion comprises a material which has a lower critical magnetic field than that of the remainder of said body of material.

6. The apparatus of clami 4 wherein said pair of conductive members is composed of material which is superconductive when energized.

7. The apparatus of claim 4 wherein said intermediate portion of said body of material is provided by a strip of material abutting the edges of a single aperture.

8. The apparatus of claim 4 including a sense member positioned adjacent said intermediate portion of said body of material.

9. In a memory device, a body of material in the superconductive state having a plurality of pairs of adjacent apertures therein arranged in columns and rows, each pair of apertures being separated by an intermediate portion of said body of material, a plurality of first and second conductive members arranged in coordinate fashion adjacent said plurality of pairs of apertures forming column and row selection lines, means for selectively energizing one of said first and one of said second conductive members with current pulses whereby energization of said conductive members conjointly is effective to establish current flow around said pair of apertures and through said intermediate portion but energization of an individual one of said conductive members is ineffective to establish such current flow.

10. The apparatus of claim 9 wherein said intermediate portion of each pair of apertures is made of material which has a lower critical magnetic field than that of the remainder of said body of material.

11. The apparatus of claim 10 wherein said plurality of first and second conductive members are composed of material which has a critical magnetic field which is higher than the critical magnetic field of said intermediate portion of said body of material.

12. The apparatus of claim 11 wherein each of the plurality of pairs of adjacent apertures and the intermediate portion separating said apertures is constituted by a strip of material abutting the edges of a single aperture.

13. The apparatus of claim 12 including a sense member positioned adjacent said intermediate portion of each pair of apertures.

14. A binary signal storage device comprising a cell of superconductive material which, at a predetermined temperature, exhibits relatively substantial resistance to current flow when under the influence of a magnetic field having a predetermined intensity and substantially no resistance to current flow when under the influence of a magnetic field less than said predetermined intensity, said cell having an aperture therein, superconductive material bridging said aperture and substantially defining a diameter to said aperture so as to produce two portions of said aperture and said superconductive material that defines said diameter, said bridging portion forming a closed superconducting loop with the superconductive material about each aperture portion, at least one portion of said cell being magnetically permeable, means to selectively apply a magnetic field having said predetermined intensity to said cell so as to establish a persistent current in a closed path within said superconductive material, and means to sense a change in persistent current positioned such that said cell lies between said means to selectively apply a magnetic field and said means to sense the presence of a change in persistent current.

15. A device according to claim 14 wherein said bridged portion of said cell has a critical field characteristic which is different from the critical field characteristic of said material defining a diameter to said circular portion.

16. A device for storing circulating persistent currents as representations of digital information values comprising, a conductive sheet having superconductive properties, means for selectively inducing persistent currents at selected locations on said sheet to thereby store digital information values; superconducting sensing means for producing an electrical representation of a circulating persistent current; and address selection means for selectively coupling said sensing means to said locations to thereby read out the information values stored at such locations.

17. A binary storage device comprising a cell of superconductive material which at a predetermined temperature exhibits relatively substantial resistance to current flow when under the influence of a magnetic field having a predetermined intensity and substantially no resistance to current flow when under the influence of a magnetic field less than said predetermined intensity, said cell forming a closed superconducting loop and including at least one portion which is magnetically permeable, means to selectively apply a magnetic field having said predetermined intensity to said cell so as to establish a persistent current in a closed path within said superconductive material, means to sense a change in persistent current positioned such that said cell lies between said means to selectively apply a magnetic field and said means to sense the presence of a change in persistent current, means for arranging a plurality of such cells in a matrix so that the means to selectively apply a magnetic field comprises coordinately arranged conductors and each cell is positioned adjacent a given X coordinate conductor and a given Y coordinate conductor, each selected X coordinate conductor and selected Y coordinate conductor lying in a plane parallel to said matrix of cells, the intersection of an X and Y coordinate being at a point adjacent to a cell.

18. In combination a persistent current element comprising a first portion and a second portion, each portion being of superconducting material, said second portion being of a material having a relatively high critical current value, said first portion being of a material having a relatively low critical current value, and means for applying a selecting current to said second portion which thereby generates a magnetic field, said field being coupled to said first portion and changing said first portion to the resistive state while the second portion remains in the superconducting state, the polarity of applied selecting current determining the direction of persistent current flow in said element.

19. The combination as recited in claim 18, said second portion being electrically connected to said first portion.

20. The combination as recited in claim 18, said first portion being connected in a closed loop magnetically coupled by the said field of said second portion.

21. A persistent current memory device comprising a closed loop of superconducting material, an electrical conductor of superconducting material having a critical current value relatively high compared with said loop material, said conductor overlying a portion of said loop.

22. A persistent-current memory device comprising a ring of superconductive material, means to cause a persistent current to flow in said ring in a direction representative of information to be stored, and means coupled to said ring to detect the existence and direction of said persistent current.

23. A superconductive inverter comprising first and second loops in closely coupled relationship and formed of superconductive material, means to maintain said loops at a temperature at which their resistivity is zero, whereby a current applied to the first loop induces a current in the second loop in reverse polarity.

24. A cell including a film of material having an aperture therein, a thin member mounted in abutting relationship with said film and bridging the aperture, electrical means for rendering said film and said member superconductive, drive means associated with said thin member for both driving the latter resistive and establishing persistent current therein and sense means associated with said thin member for indicating a persistent current.

References Cited by the Examiner

UNITED STATES PATENTS

| | | | |
|---|---|---|---|
| 2,666,884 | 1/1954 | Ericsson et al. | 307—88.5 X |
| 2,691,154 | 10/1954 | Rajchman | 340—166 |
| 2,691,155 | 10/1954 | Rosenberg | 340—166 |
| 2,725,474 | 11/1955 | Ericsson et al. | 250—36 |
| 2,832,897 | 4/1958 | Buck | 340—173 X |
| 2,913,881 | 11/1959 | Garwin | 340—173.1 |

OTHER REFERENCES

Pages 482 to 493, April 1956, "The Cryotron—A Super Conductive Computer Component" (Buck) Proceedings of the I.R.E.

Pages 19–25, June 1946, "Superconductivity" (Hewlett) General Electric Review, vol. 49, No. 6.

I. Pages 449–452, article by C. J. Gorter; pages 935–942, article by Jonker et al., 1935 Physica, vol. II.

Pages 392–395, October 1952, The Phase Transitions in Super Conductors (Faber), Royal Society of London Ser. A., vol. 214, by Martinus Nijhoff, The Hague, Netherlands.

BERNARD KONICK, *Primary Examiner.*

EVERETT R. REYNOLDS, IRVING L. SRAGOW, MALCOLM A. MORRISON, *Examiners.*

V. P. VANDENBURG, N. N. KUNITZ, M. POKOTILOW, R. G. LITTON, T. W. FEARS, *Assistant Examiners.*